United States Patent
Koo et al.

(10) Patent No.: US 10,200,980 B2
(45) Date of Patent: *Feb. 5, 2019

(54) METHOD AND APPARATUS FOR AVOIDING IN-DEVICE COEXISTENCE INTERFERENCE WITH PREFERRED FREQUENCY NOTIFICATION

(71) Applicant: BlackBerry Limited, Waterloo (CA)

(72) Inventors: Changhoi Koo, Plano, TX (US); Jun Li, Richardson, TX (US); Youn Hyoung Heo, San Jose, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/644,416

(22) Filed: Jul. 7, 2017

(65) Prior Publication Data

US 2017/0311312 A1 Oct. 26, 2017

Related U.S. Application Data

(63) Continuation of application No. 14/297,354, filed on Jun. 5, 2014, now Pat. No. 9,717,075, which is a
(Continued)

(51) Int. Cl.
*H04W 72/04* (2009.01)
*H04W 16/14* (2009.01)
(Continued)

(52) U.S. Cl.
CPC ....... *H04W 72/0413* (2013.01); *H04W 16/14* (2013.01); *H04W 72/082* (2013.01); *H04W 88/06* (2013.01); *H04W 88/10* (2013.01)

(58) Field of Classification Search
None
See application file for complete search history.

(56) References Cited

U.S. PATENT DOCUMENTS

| 7,366,128 B2 | 4/2008 | Hundal et al. |
| 7,643,811 B2 | 1/2010 | Reunamaki et al. |

(Continued)

FOREIGN PATENT DOCUMENTS

| EP | 2169840 | 3/2010 |
| JP | 2013-545328 | 12/2013 |

(Continued)

OTHER PUBLICATIONS

3GPP TR 36.816 V1.0.0 (Nov. 2010); "3rd Generation Partnership Project; Technical Specification Group Radio Access Networks; Evolved Universal Terrestrial Radio Access (E-UTRA); Study on Signalling and Procedure for Interference Avoidance for In-Device Coexistence (Release 10)"; Dec. 17, 2010; 34 pages.

(Continued)

*Primary Examiner* — Anh Ngoc M Nguyen
(74) *Attorney, Agent, or Firm* — Fish & Richardson P.C.

(57) ABSTRACT

A method, system and device are provided for avoiding in-device coexistence interference between different radio technologies deployed in adjacent bands on the same device by providing preferred frequency solutions for the in-device coexistence system.

19 Claims, 8 Drawing Sheets

Related U.S. Application Data continuation of application No. 13/069,912, filed on Mar. 23, 2011, now Pat. No. 8,805,303.

(60) Provisional application No. 61/444,657, filed on Feb. 18, 2011.

(51) Int. Cl.
*H04W 88/06* (2009.01)
*H04W 72/08* (2009.01)
*H04W 88/10* (2009.01)

(56) References Cited

U.S. PATENT DOCUMENTS

| | | | |
|---|---|---|---|
| 7,907,572 | B2 | 3/2011 | Yang et al. |
| 8,200,161 | B2 | 6/2012 | Walley et al. |
| 8,300,596 | B2 * | 10/2012 | Huang ............... H04W 36/0088 370/331 |
| 8,331,289 | B1 | 12/2012 | Lee et al. |
| 8,340,580 | B1 | 12/2012 | Epstein |
| 8,547,867 | B2 | 10/2013 | Koo et al. |
| 8,553,622 | B2 | 10/2013 | Yang |
| 8,805,303 | B2 | 8/2014 | Koo et al. |
| 8,831,611 | B2 | 9/2014 | Koo et al. |
| 2005/0185629 | A1 | 8/2005 | Kuroda |
| 2006/0292987 | A1 | 12/2006 | Ophir |
| 2007/0230377 | A1 | 10/2007 | Nosaka et al. |
| 2008/0089306 | A1 | 4/2008 | Hu |
| 2008/0107054 | A1 | 5/2008 | Parts et al. |
| 2008/0125128 | A1 | 5/2008 | Yoo et al. |
| 2008/0200124 | A1 | 8/2008 | Capretta |
| 2008/0205365 | A1 | 8/2008 | Russell et al. |
| 2009/0054009 | A1 | 2/2009 | Yang et al. |
| 2009/0074007 | A1 | 3/2009 | Yonge, III |
| 2009/0088177 | A1 | 4/2009 | Yang |
| 2009/0104909 | A1 | 4/2009 | Vesely et al. |
| 2009/0137206 | A1 | 5/2009 | Sherman |
| 2009/0180451 | A1 | 7/2009 | Alpert et al. |
| 2009/0213773 | A1 | 8/2009 | Yoon |
| 2009/0213804 | A1 | 8/2009 | Yoon et al. |
| 2009/0279511 | A1 | 11/2009 | Zhu |
| 2009/0292933 | A1 | 11/2009 | Livni et al. |
| 2010/0029204 | A1 | 2/2010 | Gao |
| 2010/0061326 | A1 | 3/2010 | Lee et al. |
| 2010/0135256 | A1 | 6/2010 | Lee et al. |
| 2010/0165973 | A1 | 7/2010 | Su et al. |
| 2010/0296590 | A1 | 11/2010 | Takasu |
| 2011/0044195 | A1 | 2/2011 | Wiemann et al. |
| 2011/0116446 | A1 | 5/2011 | Youn |
| 2011/0242969 | A1 | 10/2011 | Dayal et al. |
| 2011/0243047 | A1 | 10/2011 | Dayal et al. |
| 2011/0243094 | A1 | 10/2011 | Dayal et al. |
| 2011/0256834 | A1 | 10/2011 | Dayal |
| 2011/0268024 | A1 | 11/2011 | Jamp et al. |
| 2011/0312288 | A1 | 12/2011 | Fu et al. |
| 2012/0069766 | A1 | 3/2012 | Fu et al. |
| 2012/0077506 | A1 | 3/2012 | Wietfeldt et al. |
| 2012/0082077 | A1 | 4/2012 | Zhang et al. |
| 2012/0082140 | A1 | 4/2012 | Lin et al. |
| 2012/0087341 | A1 | 4/2012 | Jang et al. |
| 2012/0113906 | A1 | 5/2012 | Kadous et al. |
| 2012/0164948 | A1 | 6/2012 | Narasimha et al. |
| 2012/0170557 | A1 | 7/2012 | Tsfati et al. |
| 2012/0176923 | A1 | 7/2012 | Hsu et al. |
| 2012/0182896 | A1 | 7/2012 | Jang et al. |
| 2012/0195291 | A1 | 8/2012 | Kuo |
| 2012/0207032 | A1 | 8/2012 | Chen et al. |
| 2012/0207040 | A1 | 8/2012 | Comsa et al. |
| 2012/0208040 | A1 | 8/2012 | Lien et al. |
| 2012/0314598 | A1 | 12/2012 | Sadek et al. |
| 2013/0223391 | A1 | 8/2013 | Koo et al. |
| 2013/0242919 | A1 | 9/2013 | Koo et al. |
| 2014/0031036 | A1 * | 1/2014 | Koo ..................... H04W 36/14 455/434 |
| 2014/0287771 | A1 | 9/2014 | Koo et al. |

FOREIGN PATENT DOCUMENTS

| | | |
|---|---|---|
| KR | 10-2004-0060459 | 7/2004 |
| KR | 10-2009-0061244 | 6/2009 |
| KR | 10-2010-0028453 | 3/2010 |
| KR | 10-2013-0096745 | 8/2013 |
| WO | 2008/142529 | 11/2008 |
| WO | 2009/137295 | 11/2009 |
| WO | 2009/141490 | 11/2009 |
| WO | 2010/002219 | 1/2010 |
| WO | 2010/027208 | 3/2010 |
| WO | 2012/040907 | 4/2012 |

OTHER PUBLICATIONS

3GPP TR 36.816 V1.0.0 (Nov. 2010); "Chapter 4—Scenarios"; Dec. 2010; 4 pages.
Baghel, Sudhir Kumar et al; "Coexistence Possibilities of LTE with ISM Technologies and GNSS"; IEEE 2011 National Conference on Communications; Jan. 28, 2011; 5 pages.
CATT; "FDM-Based Approach for In-Device Coexistence Interference"; 3GPP TSG RAN WG2 Meeting #71bis (R2-105336); Xi'an, China; Oct. 11-15, 2010; 2 pages.
Huawei, HiSilicon, CMCC; "Open Issues on FDM"; 3GPP TSG-RAN WG2 Meeting #72bis (R2-110383); Dublin, Ireland; Jan. 17-21, 2011; 4 pages.
Intel Corporation (UK) Ltd.; "Discussion on In-Device Coexistence Scenarios and Solutions"; 3GPP Draft RAN WG2 (R2-104382); Madrid, Spain; Aug. 16, 2010.
LG Electronics Inc.; "Possible Solutions for In-Device Interference Avoidance"; 3GPP RAN WG2 (R2-104880); Madrid, Spain; Aug. 17, 2010.
MediaTek; "Analysis in In-Device Coexistence Interference Avoidance"; H 3GPP TSG RAN WG2 #71 (R2-104444); Madrid, Spain; Aug. 23-27, 2010; 10 pages.
MediaTek; "Email Discussion on Information from UE for FDM Solution" 3GPP TSG-RAN WG2 Meeting #72 (R2-106291); Jacksonville, Florida; Oct. 15-19, 2010; 7 pages.
MediaTek; "Trigger of UE Reporting for FDM Solution"; 3GPP TSG-RAN WG2 Meeting #72bis (R2-110258); Dublin, Ireland; Jan. 17-21, 2011; 4 pages.
Qualcomm Incorporated; "In-Device Coexistence Interference between LTE and ISM Bands"; 3GPP TSG-RAN WG4 Ad-hoc Meeting #10-03 (R4-102416); Bratislava, SK; Jun. 28-Jul. 2, 2010; 6 pages.
Qualcomm Incorporated; "Problem Scenarios and Proposed Solutions for In-Device Coexistence"; 3GPP RAN WG2 (R2-104910); Madrid, Spain; Aug. 17, 2010.
Research in Motion UK Limited; "Enhancement of FDM Solution and HO"; 3GPP TSG-RAN WG2#70 (R2-111234); Feb. 21, 2011.
ZTE; "Considerations of the Detail Procedure for FDM Approach"; 3GPP TSG-RAN WG2 Meeting #72bis (R2-110243); Dublin, Ireland; Jan. 17-21, 2011; 6 pages.
CMCC; "Framework and Procedure of In-Device Coexistence Interference Avoidance"; 3GPP TSG-RAN WG2 Meeting #72 (R2-106382); Jacksonville, US; Nov. 15-19, 2010; 5 pages.
Communication Pursuant to Article 94(3) EPC issued in European Application No. 10773431.1 on Jul. 25, 2016.
Communication Pursuant to Article 94(3) EPC issued in European Application No. 10773433.7 on Jul. 25, 2016.
Communication Pursuant to Article 94(3) EPC issued in European Application No. 12711291.0 on Sep. 16, 2016.
Summons to Attend Oral Proceedings issued in European Application No. 12711291.0 on May 2, 2017.
Communication Pursuant to Article 94(3) EPC issued in European Application No. 12708982.9 on Jun. 6, 2017.
International Search Report and Written Opinion in International Application No. PCT/US2010/051183, dated Jun. 29, 2011.
International Search Report and Written Opinion in International Application No. PCT/US2010/051193, dated Jul. 1, 2011, 15 pages.
International Search Report and Written Opinion in International Application No. PCT/US2010/051197, dated Jun. 29, 2011, 12 pages.

(56) References Cited

OTHER PUBLICATIONS

International Search Report and Written Opinion in International Application No. PCT/US2012/025598, dated Jun. 6, 2012, 9 pages.
International Search Report and Written Opinion in International Application No. PCT/US2012/025594, dated May 21, 2012, 13 pages.
Office Action issued in Canadian Application No. 2,826,401 dated Mar. 24, 2016.
Office Action issued in Canadian Application No. 2,813,292 dated Oct. 17, 2016.
Office Action issued in Canadian Application No. 2813247 dated Dec. 19, 2016.
Office Action issued in Chinese Application No. 201080070448.0 dated Apr. 19, 2016.
Office Action issued in Chinese Application No. 201080070450.8 dated Apr. 25, 2016.
Office Action issued in Chinese Application No. 201090070462.0 dated May 16, 2016.
Office Action issued in Chinese Application No. 201280009273.1 dated Sep. 5, 2016.
Office Action issued in Chinese Application No. 201080070462.0 dated Oct. 11, 2016.
Communication Pursuant to Article 94(3) EPC issued in European Application No. 10773432.9 on Jan. 30, 2018, 6 pages.
Extended European Search Report issued in European Application No. 17191978.0 dated May 7, 2018, 11 pages.
Communication Pursuant to Article 94(3) EPC issued in European Application No. 12709417.5, dated Sep. 20, 2017; 4 pages.
Office Action issued in Canadian Application No. 2813292 dated Sep. 29, 2017; 3 pages.

\* cited by examiner

METHOD AND APPARATUS FOR AVOIDING IN-DEVICE COEXISTENCE INTERFERENCE WITH PREFERRED FREQUENCY NOTIFICATION

CROSS-REFERENCE TO RELATED APPLICATION

This application is a continuation of U.S. application Ser. No. 14/297,354, filed on Jun. 5, 2014 which is a continuation of U.S. application Ser. No. 13/069,912, filed on Mar. 23, 2011, which claims the benefit under 35 U.S.C. § 119(e) of U.S. Provisional Application No. 61/444,657, filed Feb. 18, 2011, entitled "Method and Apparatus for Avoiding In-Device Coexistence Interference with Preferred Frequency Notification", all of which are incorporated by reference in their entirety.

BACKGROUND OF THE INVENTION

Field of the Invention

The present invention is directed in general to communications systems and methods for operating same. In one aspect, the present invention relates to the methods, systems and devices for managing coexistence interference between different radio technologies deployed in adjacent bands.

Description of the Related Art

The growing market of smart connected devices requires that the same device supports multiple radio technologies on the in-device platform. However, some configurations may cause severe performance degradation due to the in-device coexistence interference. For example, with devices that support both Long Term Evolution (LTE) and Industrial, Science and Medical (ISM) technologies (such as Bluetooth and/or WLAN) and/or Global Navigation Satellite System (GNSS) technologies, there are use cases for concurrent operation of these radios. The coexistence issues arise between ISM and/or GNSS technologies and LTE deployed in adjacent bands. As shown in Table 1 below, coexistence interference arises where ISM transmission creates interference to the LTE receiver, and also arises where LTE transmission creates interference to the ISM receiver.

TABLE 1

Interference of the LTE and ISM components on the in-device configuration

| LTE TDD (2.3-2.4 GHz, Band 40) LTE UL (2.5-2.6 GHz, Band 7) | ISM (2.4-2.4835 GHz) | Coexistence |
|---|---|---|
| Rx | Tx | LTE: Interfered ISM: Normal |
| Tx | Rx | LTE: Normal ISM: Interfered |

Similar coexistence issues occur with devices that include both LTE and GNSS components. As shown in Table 2 below, when LTE and GNSS components are working on the same device, there will be interference due to adjacent frequency band operation or harmonic frequencies which cannot be avoided by the allocation of a guard band at the sub-harmonic frequency.

TABLE 2

Interference of the LTE and GNSS component configuration on in-device

| LTE (777-787 MHz/746-756 MHz, Band 13) (788-798 MHz/758-768 MHz, Band 14) | GNSS (1575.42 MHz) | Coexistence |
|---|---|---|
| Tx | Rx | LTE: Normal GNSS: Interfered |

As will be appreciated, there are challenges to using current state-of-the-art filter technology to address coexistence interference since terminal filters do not provide sufficient rejection on the adjacent channel interference. These challenges are particularly acute in the case of these components configured in a single device where the interference occurs when the LTE component is transmitting on the specified bands. Accordingly, a need exists for improved method, system and device for managing coexistence interference between different radio technologies to overcome the problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
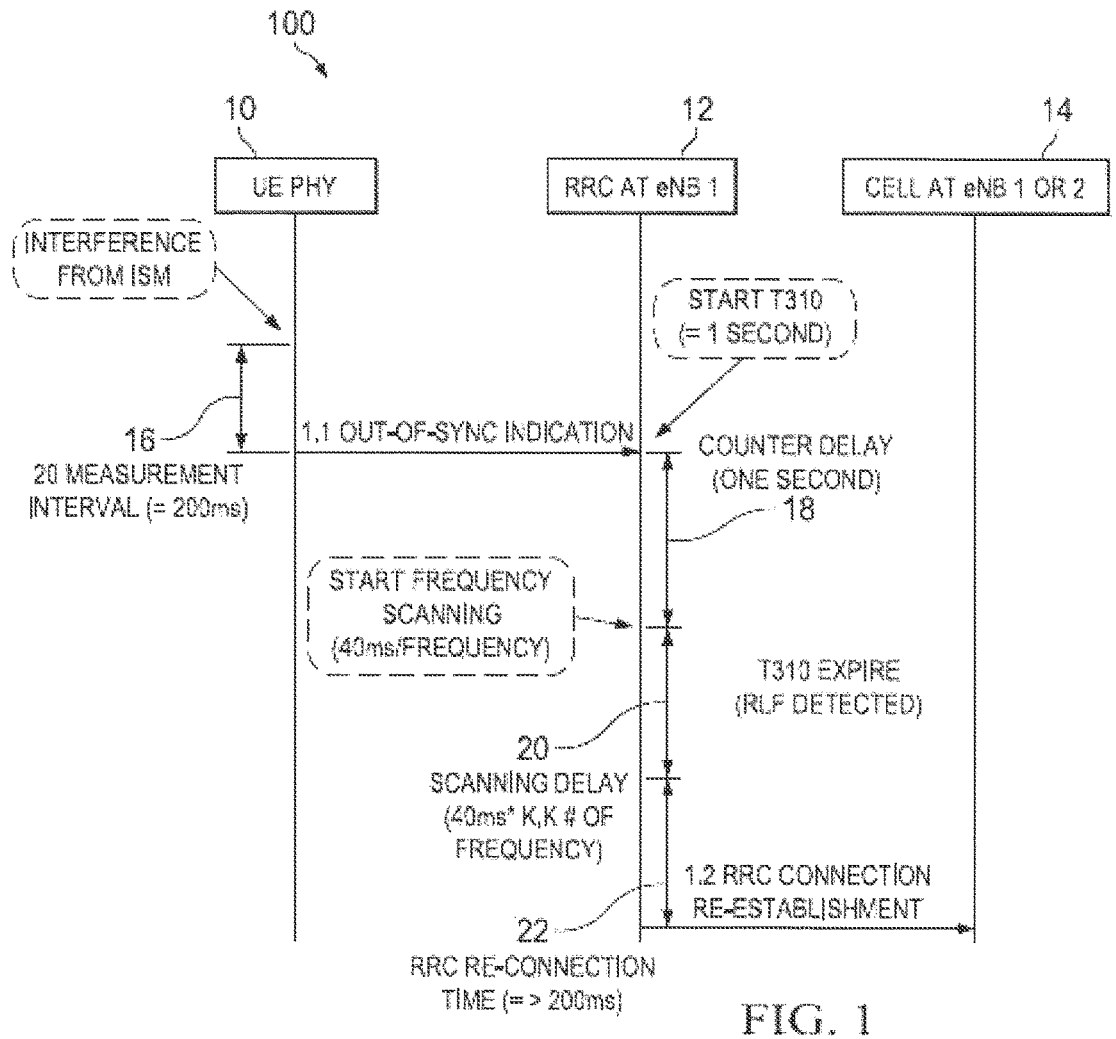
FIG. 1 is a signal flow diagram illustrating how existing radio resource management signaling procedures may be used to address coexistence interference.

A method, system and device are provided for avoiding in-device coexistence interference between different radio technologies deployed on the same device. In selected embodiments, a method and apparatus are provided for configuring LTE (Long Term Evolution) and BT (Bluetooth) components to provide an in-device coexistence operation mode by providing a preferred frequency notification scheme on the in-device coexistence platform which accounts for coexistence interference by LTE and non-LTE components on the same platform by notifying the LTE component of the operating frequency band and available channel information of non-LTE component during a coordination mode so that the LTE component is aware of interferable frequency band being used by the non-LTE component and can have a different preferred frequency band notification away from the non-LTE components (ISM or GNSS) that is set with RRC signalling during the call setup procedures.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram and flow chart form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Ongoing 3GPP discussions have addressed the technical challenges associated with addressing interference caused by concurrent operation of multiple radio technologies. The difficulties here may be understood with reference to the example of a single device which supports LTE technology with ISM (e.g., Bluetooth and/or WLAN) and/or GNSS technologies which can interfere with one another, such as when the ISM transmitter interferes with the LTE receiver, or when the LTE transmitter causes interference with the ISM and GNSS receiver operations. For example and as reported at the 3GPP report R4-102268 entitled "LS on in-device coexistence interference," the Bluetooth (BT) component error rate is unacceptable when an LTE component is active in some channels of Band 7 or even Band 40 for some BT component channel conditions. Thus, even though there is no degradation to the LTE component, simultaneous operation with the BT component can result in unacceptable disruption in voice services terminating in a BT headset. A similar issue exists when LTE transmissions interfere with GNSS components. Currently, there is no RRM (Radio Resource Management) mechanism for addressing this issue since LTE by itself does not experience any degradation. There are also interference scenarios for the LTE components caused by the non-LTE components. For example and as reported in the 3GPP report R4-102268, the LTE downlink (DL) error rate can be very high (44-55% on PDSCH) when the BT component is active and LTE is deployed in Band 40.

There have been attempts to address the coexistence interference problems using existing radio resource management (RRM) mechanisms and signaling procedures, such as RSRQ (Reference Signal Received Quality) measurement, inter-frequency/inter-RAT handover, cell (re)selection, RLF (Radio Link Failure) monitoring and connection (re)establishment. The main issues and discussions are on 1) how to identify the in-device coexistence interference 2) how to notify the network of in-device coexistence interferences 3) what kind of signaling, operation and procedures are necessary to avoid in-device coexistence interference and 4) how to choose the best way, Frequency Division Multiplexing (FDM) or Time Division Multiplexing (TDM), to avoid in-device coexistence interferences, etc. However, existing procedures require further evaluation to determine if they could handle the coexistence interference and guarantee the required quality of service (QoS). For example, a normal LTE handover procedure using RRC (Radio Resource Control) message exchange is not guaranteed to succeed when there is LTE DL interference since high DL error rates can lead to a DL Radio Link Failure (RLF), which in turn can cause unacceptable problems when the UE attempts to re-establish the connection by accessing another frequency.

One such problem with using existing RRM mechanism is the QoS degradation caused by delay in recovering from RLF which is supposed to be used only in extreme scenarios and is not designed for maintaining QoS guarantee of an on-going connection. In particular and as illustrated with reference to the signal flow diagram 100 shown FIG. 1, the time to declare RLF can be quite large, depending on the network settings of the RLF timer T310 and N310 counter. Once the UE 10 has declared DL RLF upon detecting interference from another device radio component (e.g., ISM), the UE performs an initial search during a first measurement interval 16 before sending the Out-of-Synch Indication (signal flow 1.1), shown in this example as requiring 200 ms. Then, the UE must access a different channel which leads to additional delay at the source eNB 12 associated with the counter delay 18 from the RLF timer T310 (e.g., 1000 ms), frequency scanning delay 20 (e.g., 40 ms×k, where k is the number of frequencies), and RRC reconnection time 22 (e.g., at least 200 ms) until such time as RRC connection is established via signal flow 1.2 to cell 14 at the same or different eNB. In this example, RLF recovery can take at least 1.56 sec (=200 ms+1000 ms+40 ms*k+200 ms, when k=4) to determine and recover from radio link failure.

Another problem with using existing RRM mechanisms is the ping-pong effect that arises when there is a second handover from the re-established connection at a new frequency channel back to the original frequency channel that was corrupted by the in-device interference. For example, the ping-pong scenario can occur when the desired signal strength on the corrupted channel is higher than the new frequency channel. If handover decisions are based on RSRP-based measurement reports from the UE 10, the ping-pong effect transfers the UE 10 back and forth between the corrupted channel and the desired channel, especially when the coverage is different on different carrier frequencies causing the corrupted channel to be the strongest one. While the ping-pong effect can be avoided if the source eNB 12 uses RSRQ measurements instead of (or in addition to) RSRP to make handover decisions, this would require the eNB 12 to configure all UEs in the cell to use RSRQ measurements since the eNB 12 cannot identify which UEs may be using their ISM radio, leading to additional and undesirable configuration/reporting overhead.

A number of contributions, proposals and issues have been proposed to resolve the in-device coexistence problem, but final conclusions have not been reached. For example and as disclosed at 3GPP TR36.816 v1.0.0.1: entitled "Study on signalling and procedure for interference avoidance for in-device coexistence" (Release 10), three different operation modes ("Uncoordinated," "Coordinated within UE only" and "Coordinated within UE and Network") and basic solutions (FDM and TDM) are proposed. In the "Uncoordinated" mode, different components within the same UE operate independently without any internal coordination between different components (LTE, ISM and GNSS). In the "Coordinated within UE only mode," there is an internal coordination between the different components within the same UE, which means that at least the activities of one radio is known by other component's radio, however the eNB is not aware of the coexistence issue possibly experienced by the UE and is therefore not involved in the coordination. In the "Coordinated within UE and with Network mode," different components within the UE are aware of possible coexistence problems and the UE can inform the eNB about such information and problems, so it is then mainly up to the network to decide how to avoid coexistence interference. As proposed, FDM has two different possible solutions, 1) moving LTE signal away from ISM frequency band and 2) moving ISM signal away from LTE frequency band. Based on these potential solutions and modes, some proposals and decisions have been made as a baseline for the initial discussion and study, but only concept and problem in principle have been introduced and captured, and more detail solutions and proposals will be submitted and presented in the future meetings.

FDM Solutions

With FDM solutions, the UE informs the E-UTRAN when transmission/reception of LTE or other radio signal would benefit or no longer benefit from LTE not using certain carriers or frequency resources. With this approach, UE judgment is taken as a baseline approach for the FDM solution, i.e. the UE will indicate which frequencies are (not) useable due to in-device coexistence. The indication can be sent by the UE whenever it has a problem in ISM DL reception it cannot solve by itself. The indication can also be sent by the UE whenever it has a problem in LTE DL reception it cannot solve by itself, and the eNB did not take action yet based on RRM measurements. When LTE UL transmission interferes with ISM/GNSS DL reception, LTE measurements cannot be used to detect the problem and the details of the trigger(s) for the UE to report the problem will probably not be specified in 3GPP. When ISM UL transmission interferes with LTE DL reception, it needs to be determined whether more detailed LTE DL measurement or trigger needs to be specified (e.g. with respect to when to take the measurement in relation to ISM transmissions).

The indication from the UE that a problem occurs can be classified as either reactive (meaning that a problem is reported only when it is detected), or proactive (meaning that potential problems are reported). Reactive indications are supported as the baseline and it is still be determined whether proactive indications, which are not based on LTE DL measurements, should be allowed. Proactive refers to the case that the UE reports that a frequency (serving frequency or candidate frequency) may suffer from unacceptable high interference if the ISM transmitter increases its activity. Proactive indications could be sent in the following two cases: 1) the UE asks the network not to hand itself over to certain of non-serving frequencies that may experience coexistence issues (e.g., due to increase of ISM traffic), or 2) the UE asks the network to change current serving frequency because coexistence problems may become serious due to increased ISM traffic.

The standards groups have not yet determined how this indication is transmitted (e.g., new report, CQI dummy values, dummy RSRP measurement, etc.) and if additional information would be useful to report to enable different handover policies in the eNB based on the actual interferer. The details of E-UTRAN actions upon reception of the assistant information have not been determined yet, but these FDM approaches impose significant overhead costs in generating and processing the indication messages.

TDM Solutions

With TDM solutions, it is assumed that SCO, eSCO, A2DP and ACL protocols are supported by in-device BT radio when analyzing the TDM solutions for LTE-BT coexistence. In addition, beacon, power saving and DCF protocols are assumed to be supported by in-device WiFi radio when analyzing the TDM solutions for LTE-WiFi coexistence. For TDM solutions without UE suggested patterns, the UE signals the necessary information (e.g., interferer type, mode and possibly the appropriate offset) in subframes to the eNB. Based on such information, the TDM patterns (i.e., scheduling and unscheduled periods) are configured by the eNB. For TDM solution with UE suggested patterns, the UE suggests the patterns to the eNB, and the eNB must then decide the final TDM patterns. In 3GPP TR36.816 v1.0.0.1, there are two proposed TDM solutions—a Discontinuous Reception (DRX) based solution and H-ARQ process reservation based solution.

In the DRX-based solution, the UE provides the eNB with a desired TDM pattern. For example, the parameters related to the TDM pattern can consist of (1) the periodicity of the TDM pattern, and (2) the scheduled period (or unscheduled period). It is up to the eNB to decide and signal the final DRX configuration to the UE based on UE suggested TDM pattern and other possible criteria (e.g., traffic type). The scheduling period corresponds to the active time of DRX operation, while unscheduled period corresponds to the inactive time. The eNB should try to guarantee the unscheduled period by appropriate UL/DL scheduling, SRS transmission configuration, DRX Command MAC control element usage, etc. During inactive time, the UE is allowed to delay the initiation of dedicated scheduling request and/or RACH procedure.

Keeping Time for Handover

Another approach for managing in-device coexistence interference is to establish a "keeping time" parameter as part of a coexistence mode handover procedure so that a non-interfering network node does not switch back to an interfering network node after handoff to improve the performance of handover operation. In operation, the UE triggers and transmits a measurement reporting message with "Keeping Time" and "Reason IDC (In-device Coexistence)" when it experiences interference due to in-device coexistence, and then initiates handover procedures such as inter- RAT or inter-frequency to avoid undesirable interferences from non-LTE components. After handover completion, LTE and non-LTE components could work together without mutual interference. In addition, the target eNB (T-eNB) is prevented from instructing the UE to handover back to the previous frequency of the source eNB (S-eNB)/Cell for the Keeping Time duration. During the Keeping Time, the UE may not trigger measurement reporting or the UE may exclude the frequency from the previous S-eNB/Cell for the measurement reporting. But after the Keeping Time expires, the T-eNB may instruct the UE to handover back to the previous frequency of the S-eNB/cell if the non-LTE component has been disabled, possibly resulting in interference at the UE if the non-LTE component has not been disabled.

To address the coexistence interference problems and limitations from existing solutions, there are disclosed herein techniques for providing a preferred frequency notification scheme on the in-device coexistence platform in which potentially conflicting signaling operations are separated from one another.

In selected embodiments, the disclosed signaling procedures provide a coexistence operation mode by defining new RRC signaling messages which are exchanged between the network and the mobile device for establishing a time division multiplex (TDM) mode of operation to enable coexistence operation between LTE and non-LTE components (e.g., ISM and GPS). Alternatively, new information elements are defined which may be inserted in existing RRC messages to provide TDM-based solutions to enable coexistence operation between LTE and non-LTE components. Thus, the present invention is not limited or restricted to any particular application or messaging scheme since the functionality of the proposed messages (e.g., CoExist-REQ and CoExist-RES) could be adopted as information elements (IE) in other new or existing RRC messages (e.g., RRCConnectionReconfiguration or RRCConnectionReconfigurationComplete or UECapabilityInformation messages). For example, one or more bits can be added to the UECapabilityInformation message to add a new information element indicating that the UE is a multi-component UE which may have the in-device coexistence issues. Of course, the specific names used here are for illustration only, and other names may be used to achieve the described function or outcome from the processing of the message.

With a first configuration message (or information element), a Coexistence Request Message (e.g., CoExist-REQ) is provided which the UE sends to the eNB before initiating operation of a non-LTE component on the UE device. With this message/IE, the UE device requests that operations be configured with the eNB to support cooperative signaling between the LTE and non-LTE components. As described below, the Coexistence Request Message may include proposed parameters for the coexistence operation mode, such as Start Time Offset, Keeping Time, On-Interval, Off-Interval, and Possible Link, and Action.

A Coexistence Response Message (e.g., CoExist-RSP) is also provided as a configuration message/IE which is sent by the eNB in response to CoExist-REQ to allow the coexistence operation mode. With the Coexistence Response Message, the eNB may set parameters of coexistence mode based on the UE's request and/or on the eNB's operational requirements, such as scheduling, HARQ, etc.

A Coexistence Reject Message may also be provided as a configuration message/IE which is sent by the eNB to reject the Coexistence Request Message from the UE. In selected embodiments, the Coexistence Reject Message is a separate message (e.g., CoExist-REJ), but in other embodiments, the Coexistence Response Message is instead used by configuring or adding a predetermined parameter or field (e.g., by setting a Keeping Time parameter to "zero"). In still further embodiments, the rejection message can be conveyed by having the network eNBs broadcast an indication to all UEs in the cell to disable the coexistence operation mode.

A Coexistence Deactivation Request Message may also be provided as a configuration message/IE which is sent by the UE to deactivate or modify the coexistence operation mode. In selected embodiments, the Coexistence Deactivation Request Message is a separate message (e.g., CoExist-Deact-REQ), but in other embodiments, the Coexistence Request Message is instead used by configuring or adding a predetermined field or bit(s) (e.g., an Action field) to indicate the purpose of message.

A Coexistence Deactivation Response Message may also be provided as a configuration message/IE which is sent by the eNB to respond to the Coexistence Deactivation Request Message, though in other embodiments the Coexistence Deactivation Response Message is sent by the eNB without solicitation. In selected embodiments, the Coexistence Deactivation Response Message is a separate message (e.g., CoExistDeact-RSP), but in other embodiments, the Coexistence Response Message is instead used by configuring or adding a predetermined field or bit(s) (e.g., an Action field) to indicate the purpose of message.

A UE Capability message may also be provided as a configuration message/IE which is sent by the UE to indicate UE's multi-component capability to eNB.

In accordance with selected embodiments, there is shown in Table 5 (below) additional details of the proposed messages and/or information elements with specific parameters which can be determined for the proposed operation and standard specification.

TABLE 5

Proposed messages and information elements

| Information Elements | CoExist-REQ | CoExistDeact-REQ | CoExist-RSP | CoExistDeact-RSP | Remarks |
| --- | --- | --- | --- | --- | --- |
| Action | Set | Reset or N/A | Set | Reset or N/A | Message action. If 4 messages are used, CoExistDeact-REQ and RSP messages do not include this field. |
| Start Time Offset | Immediately or SFN/subframe/slot or time | Immediately or SFN/subframe/slot or time | Immediately or SFN/subframe/slot or time | Immediately or SFN/subframe/slot or time | Beginning time of Coexistence mode operation |
| Keeping Time | SFN/subframe/slot or time | N/A | SFN/subframe/slot or time | N/A | Ending time of Coexistence mode operation |

TABLE 5-continued

Proposed messages and information elements

| Information Elements | CoExist-REQ | CoExistDeact-REQ | CoExist-RSP | CoExistDeact-RSP | Remarks |
|---|---|---|---|---|---|
| On-interval | SFN/subframe/ slot or time | N/A | SFN/subframe/ slot or time | N/A | Time duration for Activating of LTE component |
| Off-interval | SFN/subframe/ slot or time | N/A | SFN/subframe/ slot or time | N/A | Time duration for Activating of non-LTE component |
| Possible Link | Nothing, DL, UL or both | N/A | Nothing, DL, UL or both | N/A | Possible LTE component link during Off-interval |

Under each message (CoExist-REQ, CoExistDeact-, CoExist-RSP, CoExistDeact-RSP) listed in Table 5, there is shown an information element parameter (Action, Start Time Offset, Keeping Time, On-Interval, Off-Interval, and Possible Link) which provides the function or operation described in the "remarks" column.

The Start Time Offset field or parameter indicates the actual action time for when coexistence mode operation begins as either an absolute or relative value, and can be specified by system frame number (SFN), subframe, slot or actual time. SFN is a useful and an easy reference point to indicate the starting of coexistence mode operation. An absolute start time value specifies the absolute time (e.g., SFN, subframes, slots, etc.), while a relative start time specifies the Start Time Offset relative to a point in time (e.g., when the response message is received by the UE) with a time offset value (e.g., in subframes, slots or an absolute time duration, say 100 milliseconds).

The Keeping Time field/parameter specifies the time duration for maintaining the UE device in coexistence mode. At the end of the Keeping Time interval, the UE device turns off the non-LTE component(s) and goes back to the normal LTE mode. Instead of being signaled by the UE, the Keeping Time parameter can be controlled by network implementation, such as by having directly send a "Turn Off" indicator to request the UE to turn off the non-LTE components, irrespective of whether the Keeping Time parameter was signaled. Such network control may be implemented via MAC CE or RRC messaging, though MAC CE requires less delay and signaling overhead. In other embodiments, the UE may send a Turn Off request to the network (e.g., via MAC CE) to indicate the intention to turn off the non-LTE component(s), and the network sends back a Turn Off indicator to the UE (e.g., via MAC CE).

The On-interval field/parameter specifies an LTE signaling time duration for when the LTE component is able to use (transmit and receive) all of radio resources on the DL and UL without enabling the non-LTE component. During the On-interval, any non-LTE component will be disabled. In similar fashion, the Off-interval field/parameter specifies the non-LTE signaling time duration for when the non-LTE component is able to transmit and receive without the LTE component being enabled or receiving no interference.

The Possible Link field/parameter specifies an LTE component activity (none, uplink, downlink, or both) that may continue operating during the Off-interval (when LTE components are normally deactivated). This field may be used with a UE device that includes both LTE and GPS components where the GPS component will always be in reception status. In this case, the GPS components receive downlink LTE signals at the UE device, even during the Off-interval so the LTE component could utilize the resources for reception without causing interference between each component. For example, by setting the Possible Link field to Down Link (DL), the LTE component may continue to receive System Information, Paging, and the MBSFN subframes which only occur in the DL reception during Off-interval. In this way, the link specified with the Possible Link parameter will be activated regardless of On/Off interval duration. While two bits are sufficient to specify four possible link activities (e.g., "00=Nothing", "01=DL", "10=UL" and "11=both"), it will be appreciated that more or fewer link activities can be specified with additional or fewer bits.

In accordance with selected embodiments, it will be appreciated that the specific number and names of the messages can vary. For example, the four listed messages (CoExist-REQ, CoExistDeact-, CoExist-RSP, CoExistDeact-RSP) can be implemented with fewer messages, such as by setting an Action field of a message (e.g., CoExist-REQ message) to a first value (e.g., "1") to signify a Coexistence Request Message, and to a second value (e.g., "0") to signify a Coexistence Deactivation Request Message. Likewise, the Action field in the CoExist-RSP message can be used to represent both CoExist-RSP and CoExistDeact-RSP messages. Of course, the messaging functionality can alternatively be consolidated into the CoExistDeact-REQ and CoExistDeact-RSP message without requiring solicitation by a previous message, such as by setting an Action field setting in the CoExist-RSP (and CoExistDeact-RSP) message to "0" to indicate that the message sent in unsolicited manner without receiving of CoExist-REQ message. The Action field setting may also be used to add or remove any of the other information elements.

With the described messaging, a UE device requests a coexistence operation mode by proposing parameter values in the initial Coexistence Request Message, and the eNB responds with a set of operational parameters that specify a coexistence configuration. If the LTE component at the UE device cannot perform the specified coexistence configuration or wants to request a different configuration from that specified in the CoExist-RSP message from eNB, it can send another CoExist-REQ message with new requested parameters to re-negotiate the coexistence operation mode. If the LTE component does not send another CoExist-REQ message in response to the CoExist-RSP message, the LTE component implicitly accepts the configuration parameters indicated by CoExist-RSP message.

Figure 2:
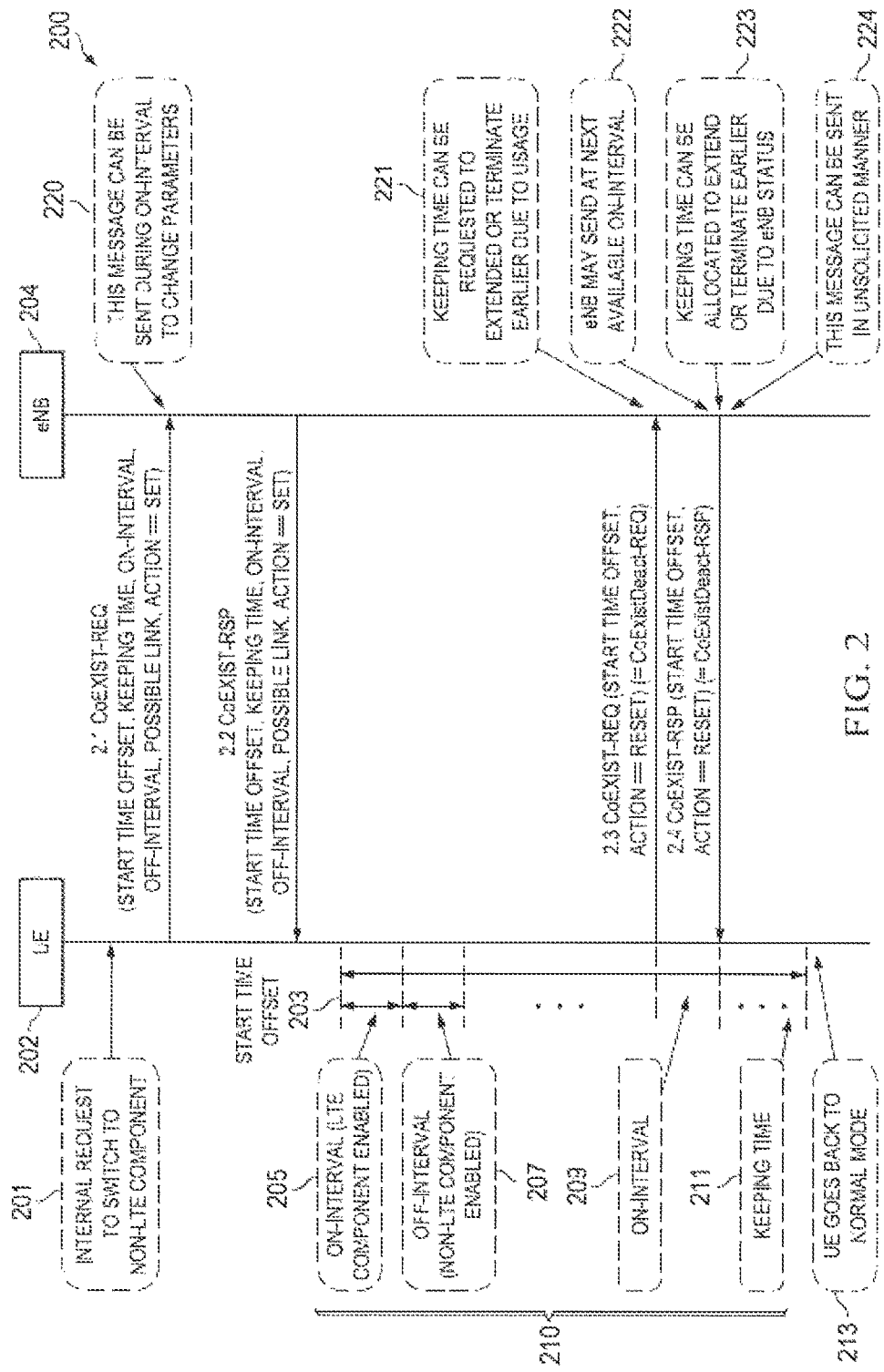
FIG. 2 is a signal flow diagram illustrating a radio resource control signaling call flow in accordance with selected embodiments of the present invention.

Turning now to FIG. 2, there is depicted a radio resource control signaling call flow 200 in accordance with selected embodiments of the present invention wherein LTE and non-LTE components installed on a single UE device platform exchange coexistence signaling messages to separate the LTE and non-LTE signaling in time, thereby avoiding coexistence interference. On this shared platform, the LTE component on the UE 202 can know the instance when the non-LTE component is enabled, and can request coexistence mode operation by sending a request message to the eNB 204 at signal flow 2.1. The eNB 204 responds with a response message (signal flow 2.2) to the UE 202 that includes signal control parameters defining a coexistence mode of operation with a start time, end time, and alternating intervals of operation for the LTE and non-LTE components.

In an example embodiment shown in FIG. 2, the UE 202 detects when an internal request to switch to non-LTE component is initiated (201). In response, the UE 202 (or LTE component thereon) sends a request message (CoExist-REQ message 2.1) to the eNB 204 with proposed coexistence parameters, such as Start Time Offset, Keeping Time, On-interval, Off-interval, Possible Link, and an Action field set to "1." If the LTE component at the UE 202 is coexisting with ISM components, the Possible Link parameter can be set to "Nothing" in order to ensure no coexistence interference issues. On the other hand, if the LTE component at the UE 202 is coexisting with a GPS component, the Possible Link parameter can be set to "DL" so that the LTE component can receive messages in the DL while the GPS component receiver is enabled. As will be appreciated, the LTE component at the UE 202 sends the request message to the eNB 204, so the LTE component must either be "on" or at least activated in an "On-interval" during coexistence mode (220).

On reception, the eNB 204 sends a response message (CoExist-RSP message 2.2) back to the UE 202 in response to the request message CoExist-REQ. This response message accepts or modifies the proposed coexistence parameters from the UE's request message by returning a set of (counter-proposed) coexistence parameters, such as Start Time Offset, Keeping Time, On-interval, Off-interval, Possible Link, and Action field set to "1." The response message 2.2 may configure the coexistence parameters as absolute or delta configuration values. With an absolute value configuration, the eNB 204 sends all related coexistence parameters in the response message 2.2, but with a delta value configuration, the eNB 204 only sends the coexistence parameters in the response message 2.2 that are different from the request message 2.1.

Based on the coexistence parameters in the response message received by the UE 202, the LTE component enters into a coexistence operation mode, beginning at the Start Time Offset 203 and continuing until expiration at the Keeping Time 211, with alternating On-intervals 205, 209 (during which the LTE component is enabled) and Off-intervals 207 (during which the non-LTE component is enabled).

During the coexistence mode 210, the LTE component may optionally send an update message 2.3 to the eNB 204 to request that the duration of the coexistence operation mode 210 be extended or terminated. In selected embodiments, the update message 2.3 is a separate message (e.g., CoExistDeact-REQ message) received at the eNB (221) which seeks to deactivate or extend the coexistence operation mode, such as by terminating or extending the Keeping Time. In other embodiments, the update message uses the first request message (CoExist-REQ message) which has the Action field set to "0." In either case, the update message 2.3 may include update parameters, such as Start Time Offset and an Action field reset to "0," where the updated Start Time Offset value specifies the new end point or Keeping Time value for the coexistence operation mode 210.

The eNB 204 responds to the update message 2.3 by sending an update response 2.4 during an available On-interval 209 (222). In selected embodiments, the update response 2.4 is a separate message (e.g., CoExistDeact-RSP message), while in other embodiments, the update message uses the first response message (CoExist-RSP message) which has the Action field reset to "0." With the update response message 2.4, the coexistence operation mode is deactivated or extended depending on the eNB status (223), such as by terminating or extending the Keeping Time. And while the update response 2.4 is shown as being sent in response to the update message 2.3, the update response 2.4 may be sent in unsolicited manner without receiving an update message (224). For example, the update message 2.4 can be sent without solicitation (224) if the eNB 204 determines that the coexistence operation mode requires extension or early termination. Once the Keeping Time 211 expires, the LTE component in the UE 202 and the eNB 204 return to normal mode 213 where the LTE component is enabled and the non-LTE component is disabled and turned-off.

Figure 3:
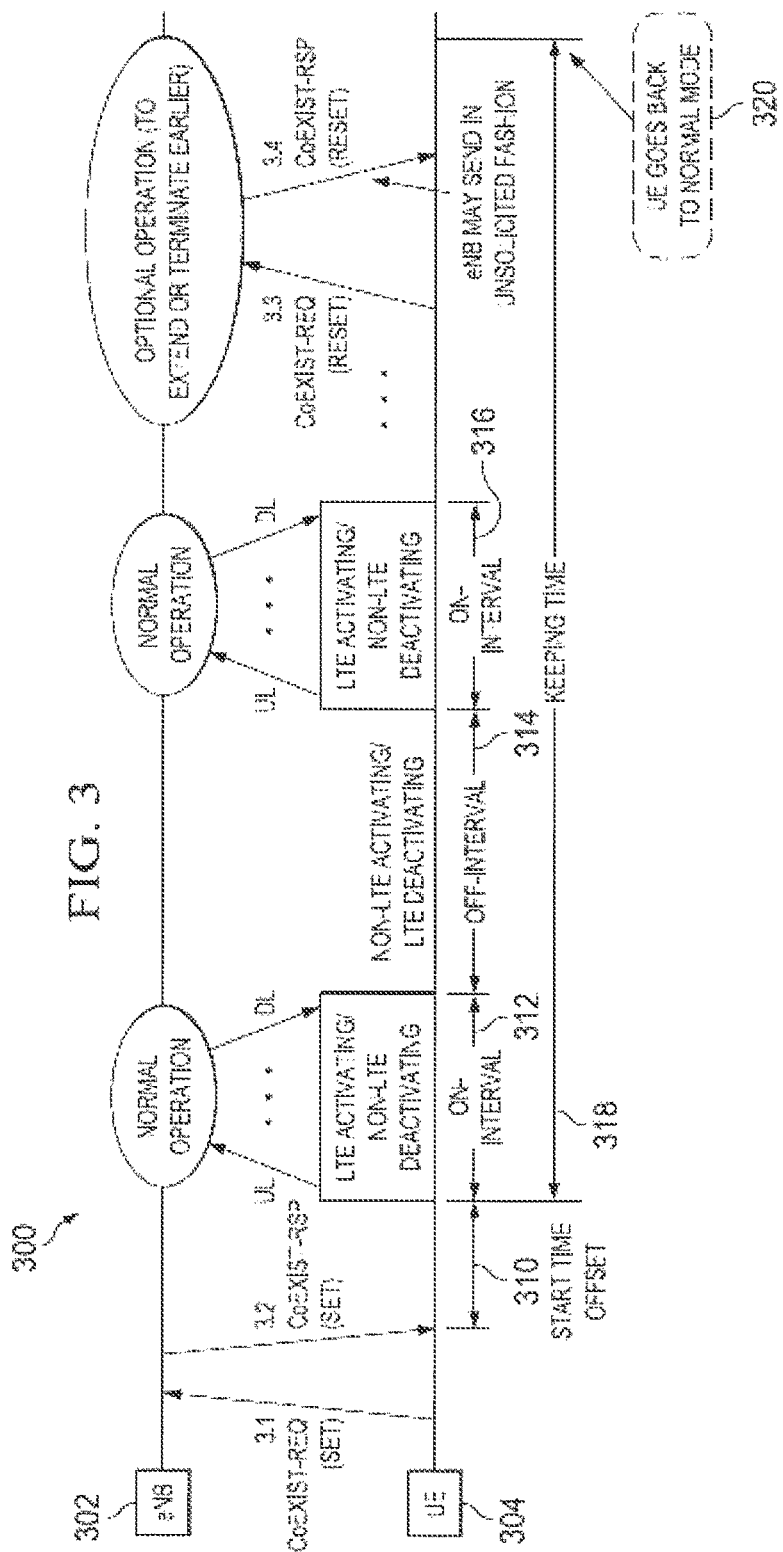
FIG. 3 illustrates a signal timing flow for LTE and ISM devices where the "Possible Link" setting is set to a first value indicating that no LTE device signal reception is expected during an Off-Interval.

Turning now to FIG. 3, there is illustrated a signal timing flow 300 for establishing a coexistence operation mode between eNB device 302 and UE device 304 having LTE and ISM components. The expected coexistence operation mode is set up by exchanging request and response messages in which the "Possible Link" setting in the coexistence parameters is set to a first value indicating that no LTE device signal reception is expected during the Off-interval. First, the UE 304 sends a first request message 3.1 (e.g., CoExist-REQ message) to the eNB 302 with proposed coexistence parameters, such as start time (e.g., Start Time Offset 310), end time (e.g., Keeping Time 318), On-interval 312, Off-interval 314, and Action field (e.g., set to "1"). In addition, the Possible Link field may be set to "Nothing" (e.g., "00") for LTE and ISM components to signify that no LTE signal reception is expected when the ISM component(s) are activated. In the response message 3.2 (e.g., CoExist-RSP message), the proposed parameters are accepted, repeated or modified so that the UE 304 and eNB 302 are configured to establish a coexistence operation mode having defined On-interval(s) 312, 316 during which the LTE component is in normal operation mode. In normal operation, the activated LTE component in the UE 304 sends uplink data to the eNB 304 and receives downlink data from the eNB 302, and the non-LTE component(s) are disabled and turned off. The established coexistence operation mode also has a defined Off-interval 314 during which the LTE component is disabled and the non-LTE component(s) are enabled to transmit and receive signals. The depicted On-intervals and Off-intervals may each have a fixed time duration and periodicity so that the alternating intervals repeat until expiration of the Keeping Time 318 provided that an update response message is not received from the eNB 302. However, update messaging may be generated to terminate or extend the Keeping Time. For example, the UE 304 may send an update message 3.3 (e.g., a CoExistDeact-REQ message or a reset CoExist-REQ message) to request extension or early termination of the Keeping Time. Alternatively, the eNB can sent an (unsolicited) update response message 3.4 (e.g., a CoExistDeact-RSP message or reset CoExist-RSP messages) to extend or terminate the Keeping Time. Upon expiration of the Keeping Time 318, the UE 304 returns to normal LTE mode 320 with the non-LTE components deactivated.

Figure 4:
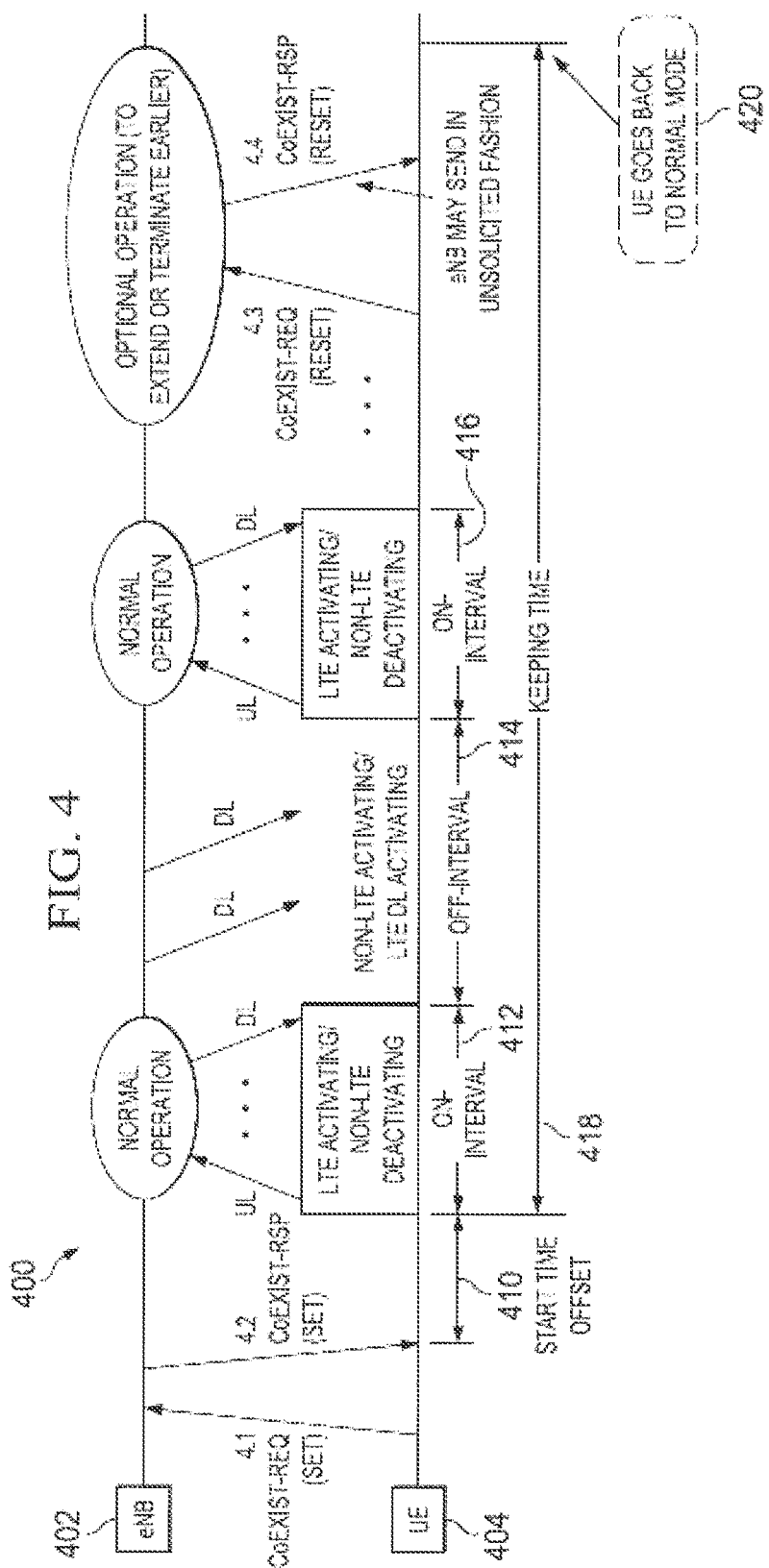
FIG. 4 illustrates a signal timing flow for LTE and ISM devices where the "Possible Link" setting is set to a second value indicating that downlink LTE device signal reception is expected during an Off-Interval.

Turning now to FIG. 4, there is illustrated a signal timing flow 400 for establishing a coexistence operation mode between eNB device 402 and UE device 404 having LTE and GPS components where LTE downlink device signal reception is expected during the Off-interval. The expected coexistence operation mode is set up by exchanging request and response messages in which the "Possible Link" setting in the coexistence parameters is set to a second value indicating LTE downlink signal reception is expected during the Off-interval. To set up the expected coexistence operation mode, the UE 404 sends a first request message 4.1 (e.g., CoExist-REQ message) to the eNB 402 with proposed coexistence parameters, such as start time (e.g., Start Time Offset 410), end time (e.g., Keeping Time 418), On-interval 412, Off-interval 414, and Action field (e.g., set to "1"). In addition, the Possible Link field may be set to "DL" (e.g., "01") for LTE and GPS components to signify that LTE downlink signaling is expected when the LTE components are de-activated. In the response message 4.2 (e.g., CoExist-RSP message), the proposed parameters are accepted, repeated or modified so that the UE 404 and eNB 402 are configured to establish a coexistence operation mode having defined On-interval(s) 412, 416 during which the LTE component is in normal operation mode for sending and receiving uplink and downlink data while the non-LTE component(s) are disabled and turned off. The established coexistence operation mode also has a defined Off-interval 414 during which the non-LTE component(s) and LTE downlink signaling are enabled, but where the LTE component is otherwise disabled. In this configuration, even though the LTE component is in Off-interval 414, it can receive the DL traffics and signals from the eNB 402. The depicted On-intervals 412 and Off-intervals 414 are alternated until expiration of the Keeping Time 418, unless update messaging 4.3 and/or 4.4 is generated to terminate or extend the Keeping Time 418. Upon expiration of the Keeping Time 418, the UE 404 returns to normal LTE mode 420 with the non-LTE components deactivated.

With the disclosed arrangement for establishing a coexistence operation mode, the LTE and non-LTE signaling is separated into different signaling intervals, thereby avoiding coexistence interference without incurring QoS degradation or time delay associated the DL RLF mechanisms.

In addition to or in place of the scheme for separating the LTE and non-LTE signaling in time, coexistence interference can be avoided by performing an LTE handover from a first eNB/cell/frequency to a second eNB/cell/frequency in the event of coexistence interference at the first eNB/cell/frequency. For example, an LTE component that is experiencing interference from a non-LTE component can use existing RRM procedures to request a handover to neighboring cell or frequency. However, this can lead to a "ping-pong" handover problem when the LTE component attempts to return to the previous eNB/cell/frequency when the co-interference at the first eNB/cell/frequency is reduced due to the non-LTE component being turned off, such as when the previous eNB/cell or frequency has a stronger signal. Depending on the non-LTE component behavior, the ping-pong handovers can occur frequently, thereby consuming bandwidth with undesirable signaling overhead. To reduce or eliminate ping-pong handover operation, an improved handover operation is disclosed which uses predetermined triggering events and associated procedures to prevent handover back to the source eNB/cell/frequency during a specified time interval.

Figure 5:
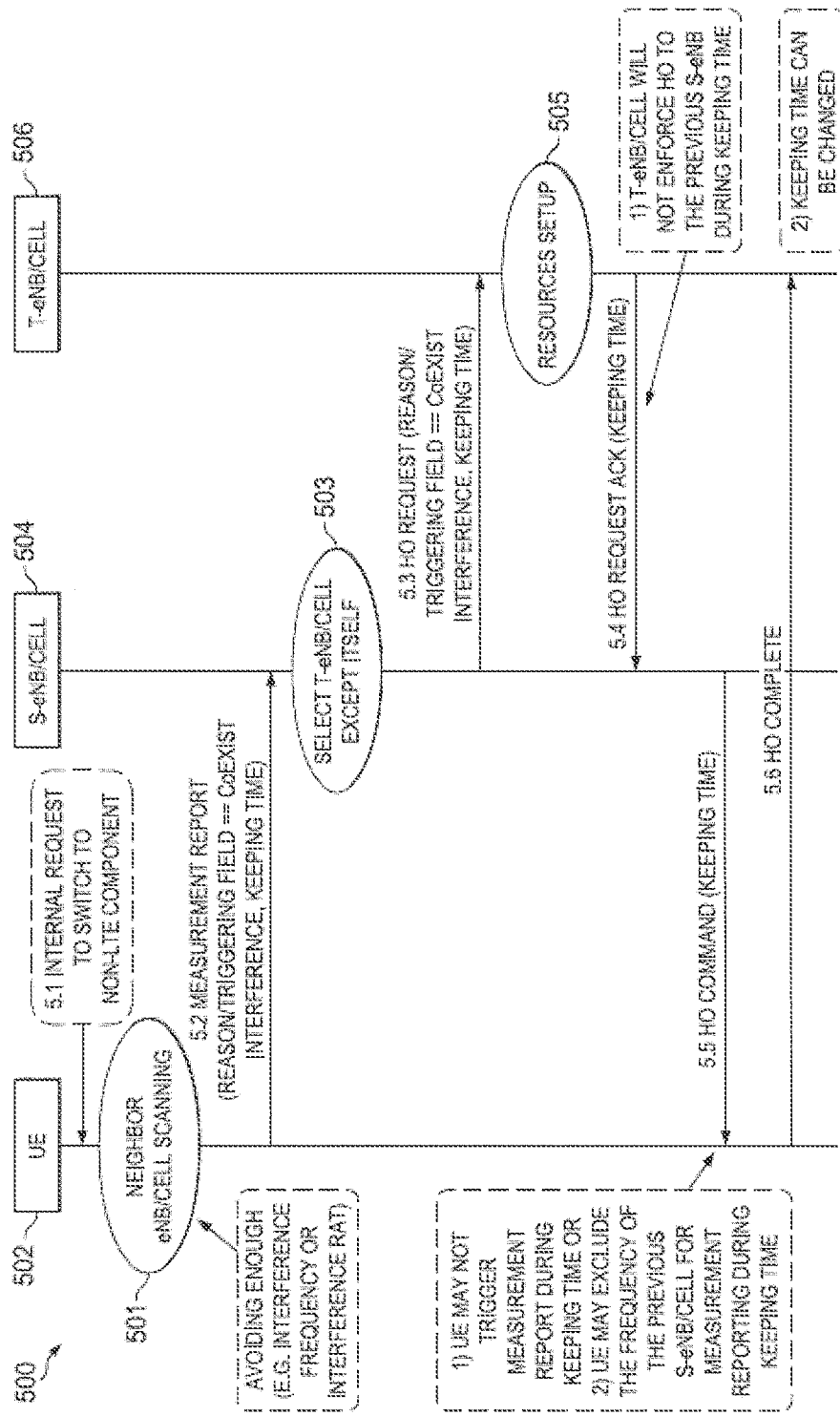
FIG. 5 is a signal flow diagram for a UE-requested handover signaling call flow in accordance with selected embodiments of the present invention.

To illustrate the improved handover procedure, reference is made to FIG. 5 which shows a signal flow diagram 500 for a UE-requested coexistence handover operation in accordance with selected embodiments of the present invention. Generally speaking, the UE 502 requests that the source eNB/cell 504 perform a handover to a target eNB/cell 506, where the handover may be implemented in inter-frequency or inter-RAT environments. The requested handover specifies a time interval or Keeping Time during which time the target eNB/cell 506 is prevented from performing a handover back to the source eNB/cell 504. With the disclosed coexistence handover operation, the LTE component at the UE 502 does not need to indicate to the eNB 504 when any non-LTE components are enabled at the UE 502, but just starts a handover procedure to avoid undesirable interference from/to non-LTE components at the UE 502. After completion of handover, the LTE and non-LTE components at the UE 502 can work simultaneously without any interference between them.

In particular, the signal flow begins when the UE 502 detects that a handover is required. The detection can be based on any desired triggering event, such as receiving an internal message signal 5.1 requesting that the UE 502 enable or switch to a non-LTE component. In response, the UE 502 scans the neighboring eNB/cells or frequencies (501) to evaluate their signal strength and identify any neighboring eNBs or cells that will not interfere with the non-LTE signaling at the UE 502. Based on the scan results, the UE 502 generates and sends to the serving eNB/cell 504 a measurement report (message signal 5.2) which identifies the triggering event for the handover. At this point, the LTE component can select the target eNB/cell or frequencies 506 to avoid coexistence interference fully (e.g., inter-frequency or inter-RAT). In the case of handover being triggered by in-device coexistence interference, the "Reason/Triggering" field in the measurement report 5.2 identifies the cause as "CoExist Interference," depending on how the coexistence interference was detected.

To support efficient and prompt handover, one or more predetermined triggering events are proposed for use in the "Reason/Triggering" field of the measurement report 5.2. In particular, Table 6 below lists the handover triggering events listed in 3GPP TS 36.331 ("Evolved Universal Terrestrial Radio Access (E-UTRA); Radio Resource Control (RRC); Protocol specification"), along with new triggers A6-A8 and B3.

TABLE 6

Triggering events for handover cases

| Event | Existing and New Triggering Reasons | HO Usage |
|---|---|---|
| A1 | Serving cell becomes better than absolute threshold | LTE |
| A2 | Serving cell becomes worse than absolute threshold | LTE |
| A3 | Neighbor cell becomes better than an offset relative to the serving cell | LTE |
| A4 | Neighbor cell becomes better than absolute threshold | LTE |
| A5 | Serving cell becomes worse than one absolute threshold and neighbor cell becomes better than another absolute threshold | LTE |
| A6 | Serving cell becomes worse than one absolute threshold and neighbor cell becomes better than another absolute threshold due to in-device coexistence interference | LTE |
| A7 | Neighbor cell becomes better than an offset relative to the serving cell due to in-device coexistence interference | LTE |
| A8 | Serving cell becomes worse than absolute threshold due to in-device coexistence interference | LTE |
| B1 | Neighbor cell becomes better than absolute threshold | Inter-RAT |
| B2 | Serving cell becomes worse than one absolute threshold and neighbor cell becomes better than another absolute threshold | Inter-RAT |
| B3 | Serving cell becomes worse than absolute threshold and neighbor cell becomes better than another absolute threshold due to in-device coexistence interference | Inter-RAT |

As shown in Table 6, triggering events of A6-A8 are proposed for LTE handovers, and triggering event B3 is proposed for Inter-RAT handovers. Trigger event A6 is used by the UE 502 to request an LTE handover when a signal strength measure (e.g., Reference Signal Received Quality (RSRQ) or Reference Signal Received Power (RSRP)) for the serving eNB/cell 502 is below a first absolute threshold and a signal strength measure (e.g., RSRQ or RSRP) for the target eNB/cell 506 is above a second absolute threshold. Trigger event A7 is used by the UE 502 to request an LTE handover when a signal strength measure for a neighboring/target eNB/cell 506 is better than an offset relative to a signal strength measure of for the serving eNB/cell 502 due to in-device coexistence interference at the UE 502. Trigger event A8 is used by the UE 502 to request an LTE handover when a signal strength measure for a serving eNB/cell 502 becomes worse than an absolute threshold due to in-device coexistence interference at the UE 502. Finally, trigger event B3 is used by the UE 502 to request an Inter-RAT handover when a signal strength measure for the serving eNB/cell 502 becomes worse than an absolute threshold due to in-device coexistence interference at the UE 502.

In order for the UE 502 to send the inter-frequency/inter-RAT measurement report 5.2 based on the proposed triggers A6-A8 and B3, the serving eNB/cell 504 configures the UE 502 with a measurement identity that corresponds to an inter-frequency/inter-RAT measurement object. At RRC connection establishment or at any time while in connected mode, the UE 502 sends an RRC message to the serving eNB/cell 504 to indicate that the UE 502 has both LTE components and coexisting non-LTE component(s) (e.g. ISM and/or GPS). The message may also include an indication from the UE 502 of the preferred target carrier frequencies to handover to (or the carrier frequencies to avoid) when coexistence interference arises. In this way, the serving eNB/cell 504 can configure one or more measurement identities that correspond to carrier frequencies where coexistence interference is expected to be low or tolerable. In selected embodiments, the serving eNB/cell 504 only needs to configure the inter-frequency/inter-RAT measurement identities for the UE 502 if the carrier frequency of the serving eNB/cell 504 is potentially interfering because it is located close to the non-LTE component band or belongs to one of the carrier frequencies to avoid as indicated by the UE 502. The measurement quantity configured for the inter-freq/inter-RAT measurement identities should be set to RSRQ in order to capture the interference caused by non-LTE component band.

In other embodiments, a triggering handover mechanism may be applied to the RSRQ measurement of the serving eNB/cell 504 to account for the bursty interference caused by transmission in the non-LTE band. The triggering handover mechanism may operate as follows. If the RSRQ signal strength measure is below a specified threshold, X, for a specified duration, Y, a counter, N, at the UE 502 is incremented by one. When the value of counter N exceeds a specified threshold, the UE 502 sends a measurement report to the eNB 504 which includes inter-frequency/inter-RAT measurement results that correspond to the frequencies/RATs of the configured measurement identity.

In addition to specifying a handover triggering event, the measurement report 5.2 from the LTE component also proposes a time interval (e.g., Keeping Time) to the eNB/cell 504. The specified Keeping Time value will be used after handover to maintain the new connection with the target eNB/cell 506 for the specified time interval. Alternatively, the Keeping Time/time interval can also controlled by network implementation rather than by signaling from the UE 502, such as by having the network eNBs broadcast the Keeping Time information to all eNB/cells.

Upon receiving the measurement report message 5.2, the serving eNB/cell 504 sends a handover request message 5.3 (HO-REQUEST) to the target eNB/cell 506 which identifies the reason (e.g., in the Reason/Triggering field) and Keeping Time as received from the UE 502. If the UE 502 did not already select the target eNB/cell 506, the source eNB/cell 504 may identify the target eNB/cell 506 in a list of target cells that does not include the source eNB/cell 504 (503).

At the target eNB/cell 506, the resources for the UE 502 are set up (505), and then the target eNB/cell 506 send back a handover acknowledgement message 5.4 (HO-REQUEST-ACK) with Keeping Time to the serving eNB/cell 504 in response to the handover request message 5.3. In selected embodiments, the target eNB/cell 506 may change the Keeping Time value from that proposed by the UE 502, based on status and/or environmental considerations at the target eNB/cell 506. Based on the received Keeping Time and any identified triggering events related to coexistence interference, the target eNB/cell 506 may be configured to keep the new connection with the LTE component for at least the duration of the Keeping Time. In addition or in the alternative, the target eNB/cell 506 instructs the UE 502 that is can not handover the frequency back to the serving eNB/cell 504 for the duration of the Keeping Time to avoid undesirable ping-pong handover between the previous serving eNB/cell 504 and new target eNB/cell 506.

Upon receiving the handover acknowledgement message 5.4, the serving eNB/cell 504 sends a handover command message 5.5 (HO-COMMAND) to instruct the UE 502 to perform handover to the target eNB/cell 506. The handover command message 5.5 may include the Keeping Time value specified by the target eNB/cell 506 for use by the UE 502 in preventing ping-pong handovers. For example, the handover command message 5.5 may include an instruction to prevent the UE 502 from generating a measurement report during the Keeping Time interval, thereby preventing initiation of another handover procedure. Alternatively, the handover command message 5.5 may instruct the UE 502 to exclude the frequency of the serving eNB/cell 504 from any measurement reporting conducted during the Keeping Time interval, thereby preventing initiation of another handover procedure to the serving eNB/cell 504.

On successful acquisition of the target eNB/cell 506, the UE 502 sends the handover complete message 5.6 (HO-COMPLETE) to signify completion of the handover procedure. After completion of handover, target eNB/cell 506 is configured to prevent handover of the UE back to the frequency of the previous serving eNB/cell 504 during the Keeping Time interval. However, the target eNB/cell 506 may initiate handover to another target eNB/cell (not shown) which is not on the frequency of the serving eNB/cell 504.

With the disclosed coexistence handover operation, the serving eNB/cell 504 informs the target eNB/cell 506 that the UE 502 should not be handed back to the serving eNB/cell 504 during the specified Keeping Time duration. This restriction prevents handover back to the original frequency of the previous serving eNB/cell 504, even in situations where the signal strength of the serving eNB/cell 504 (or any cell on the same frequency) is higher than that of the target eNB/cell 506, even if the non-LTE component at the UE 502 is not enabled. If the target eNB/cell 506 is not notified that the handover of the UE 502 is due to coexistence interference, the target eNB/cell 506 may try to handover the UE 502 back to the original frequency of the previous serving eNB/cell 504 or frequency when the non-LTE component is disabled. This could trigger another handover immediately away from the original cell 504 upon reactivation of the non-LTE component. Likewise, a number of consecutive On-interval/Off-interval repetitions during the Keeping Time could induce the undesirable ping-pong operation if there is no restriction on the LTE component measuring the source eNB/cell or frequency.

In selected embodiments, it will be appreciated that the triggering events A6-A8 and B3 are not used when there is coexistence interference detected at the UE 502. In these embodiments, when the UE 502 scans the neighboring eNB/cells and generates the associated measurement reporting, the measurement report is configured to include an indicator (to indicate to the network the measurement report is caused by the coexistence scenario) and a Keeping Time value (to prevent ping-pong handovers during the Keeping Time interval).

Preferred Frequency Notification

In selected embodiments, in-device coexistence interference from Bluetooth components is managed by specifying a preferred frequency allocation scheme for cases where the LTE component on the in-device coexistence platform is aware of the non-LTE component installed on the same platform and the operating frequency band and available channel information of non-LTE component can be shared with LTE component under a coordination mode. In this arrangement, the LTE component knows the expected potential frequency band (referred to as the "interferable frequency band") when the non-LTE component is enabled. With this knowledge, the LTE component on the in-device coexistence platform may specify a preferred frequency band notification away from the non-LTE components (ISM or GNSS), where the preferred frequency band could be set with RRC signaling during the call setup procedures.

Figure 6:
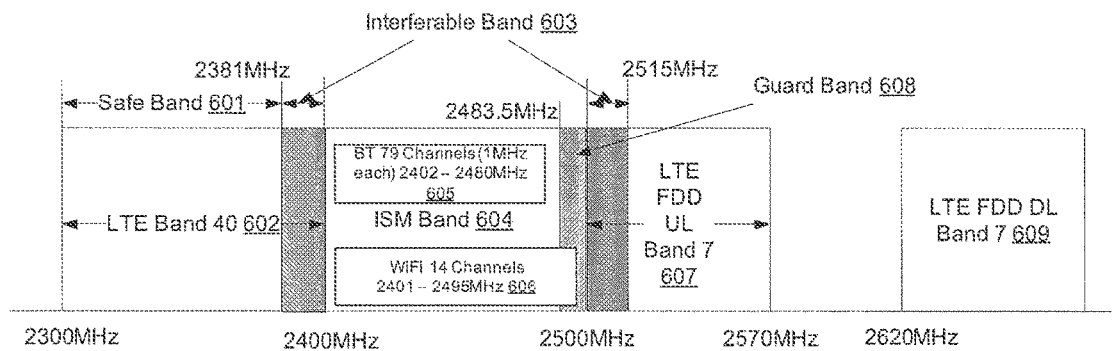
FIG. 6 shows an example spectrum band allocation of LTE and non-LTE components used in a preferred frequency notification scheme.

In defining a preferred frequency for avoiding in-device coexistence interference, it will be appreciated that such RF filter-based solutions typically require at least 20 MHz band separation between LTE and non-LTE components. This frequency separation is shown in FIG. 6 which depicts the spectrum band allocation of LTE and non-LTE components where LTE Band 7 607 does not induce the interference to BT 605 if 20 MHz separation is enough for the isolation between two bands. In similar fashion, LTE Band 40 602 and non-LTE component in the ISM band 604 may experience the interference together due to adjacent band effect if there is not enough RF filtering. It will also be appreciated that GNSS systems can also experience interference from the LTE component because GNSS systems generally operate at around 1575.42 MHz which overlaps with 2nd harmonic frequency of LTE Band 13/14, 1554-1574 MHz/ 1576-1596 MHz of LTE Band 13 UL (777-787 MHz) and Band 14 UL (788-798 MHz) when an LTE component transmits while in the GNSS is in the reception status.

As seen from the spectrum allocation shown in FIG. 6, a BT component operating on Channel #1 (2402-2403 MHz) in BT band 605 will experience interference with LTE Band 40 operating on 2382-2400 MHz. Likewise, if the WiFi component in WIFI band 606 is working on the Channel #1 (2401-2423 MHz), 2381-2400 MHz of LTE Band 40 in LTE band 602 will be interfered. Also, if the WiFi component in WIFI band 606 is working on the Channel #14 (2473-2495 MHz), 2500-2515 MHz of LTE Band 7 in LTE band 607 will give interference. As a result, there are a number of known interferable bands 603 assuming the in-device coexistence operation and band allocation in use, meaning that the UE can be aware of the specific frequency which can be interferable when the non-LTE components are enabled. In addition, if the LTE component and non-LTE component have internal communication in the in-device coexistence, the UE can determine the specific frequency which is in the interferable frequency band.

Based on the known operating frequency information of the non-LTE component, selected embodiments of the present invention provide procedures and information elements for implementing a preferred frequency notification scheme where the UE indicates the specific frequency with fixed or variable boundary using regular RRC signaling messages or new message and procedures. In particular, a proposed preferred frequency request is generated when the LTE detects the interference due to the in-device coexistence by having the UE send an indication message to the eNB with or without the frequency information which includes usable and non-usable frequencies for the LTE component. In support of this request scheme, the LTE component should know the characteristics of the interference from/to the non-LTE component. However, if the specific frequency bands which have a higher possibility by the in-device coexistence interference are determined in advance at the eNB side, the UE indicates to the eNB the preferred frequency band or boundary which can be fixed/pre-determined or variable.

In case of FDM solution and coordinated mode, the UE does not need to measure the interference if non-LTE component internally indicates to LTE component. Though any desired messaging scheme may be used to convey preferred frequency information, it will be appreciated that any RRC message could be used to convey the indication for setting the frequency boundary or preferred frequency information, such as the UECapabilityInformation message, the UEInformationResponse message, the RRCConnectionRequest message, the RRCConnectionReconfigurationComplete message, the RRCConnectionReestablishmentRequest message, or the MeasurementReport message.

As will be appreciated, the preferred frequency boundary information is used to protect the signal from the undesirable interference, and could be set as a system parameter. When different radio technologies are installed on the UE, the LTE component and non-LTE component on the UE are able to know the operating frequency range each other. And according to the performance of the RF filter installed in the UE, different components know the interfereable frequency band (e.g., 603) so that each component can know the safe band range (e.g., 601) while another component is running. In this way, the eNB can set the frequency boundary and allocate the safe frequency without frequency information from the UE. Thus, the system already includes the frequency boundary information for various configurations for the in-device coexistence at the UE.

When a UE sends an indication, it can set the specific band information as frequency boundary based on the non-LTE component operating frequency. For example, if the LTE component is operating at Band 40 and Band 7, the indication can be set to 2,380 MHz and 2,515 MHz, respectively, assuming 20 MHz RF filter performance. Once the eNB receives the message with the frequency information, it sets the frequency as a preferred frequency for the resolving of the in-device coexistence interference. In other embodiments, the message may not include the specific frequency information, but instead includes the type of component installed with LTE component in the UE. To increase the band efficiency and precise allocation at least 2 bits are needed to express the type of the components, "00" for "BT", "01" for "WLAN", "10" for "GNSS" and "11" for the reservation. Alternatively, a single bit could be used to identify ISM ("0") or GNSS ("1"). Therefore, when the eNB receives the indication which stands for the in-device coexistence occurrences and type of non-LTE device, it can implicitly allocate the safe frequency band. The default safe frequency band should be pre-configured in the eNB by Operations and Maintenances.

Figure 7:
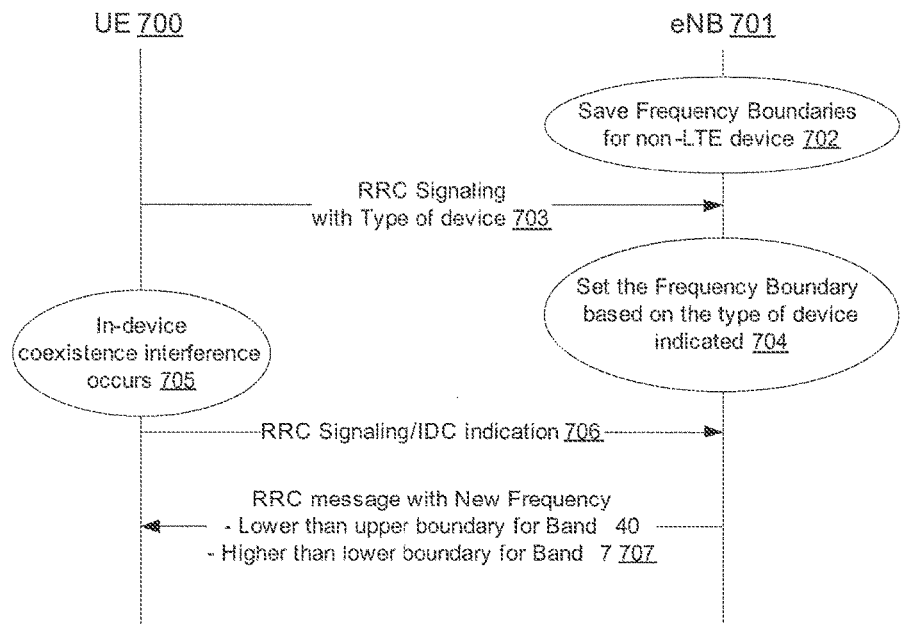
FIG. 7 is a signal call flow diagram for using a predetermined preferred frequency scheme to manage in-device coexistence interference.

To illustrate the operation of the process for using a predetermined preferred frequency, reference is made to FIG. 7 which depicts the call flow between the UE 700 and eNB 701. As depicted, the eNB saves the frequency boundary information 702 as a system parameter for the in-device coexistence. For example, assuming 20 MHz RF filter for cutting off the interferences for ISM components with LTE Band 40 and LTE Band 7, the preferred frequency boundary could be 2,380 MHz and 2,515 MHz, respectively. The UE sends a RRC signaling message 703 before the in-device coexistence occurs or with an IDC indication message 706 when the in-device coexistence interference occurs 705. Once getting the RRC message or indication, the eNB allocates the new frequency 707 based on the saved frequency boundary which can avoid the in-device coexistence interferences based on the type of the non-LTE component sent by the UE.

By now it should be appreciated that there is disclosed herein a method for use in a radio access network (eNB) by user equipment (UE) having a first radio technology component (e.g., an LTE component) and a second radio technology component (e.g., a GNSS or ISM) on a single platform. In the disclosed system and methodology, a frequency allocation scheme is provided for requesting and allocating the preferred frequency for the in-device coexistence systems by providing fixed preferred frequency boundary notifications for the in-device coexistence operation, along with an information element and bit format to indicate the preferred frequency notification to the eNB in the context of a call flow sequence for allocating the safe frequency for the in-device coexistence operation.

Figure 8:
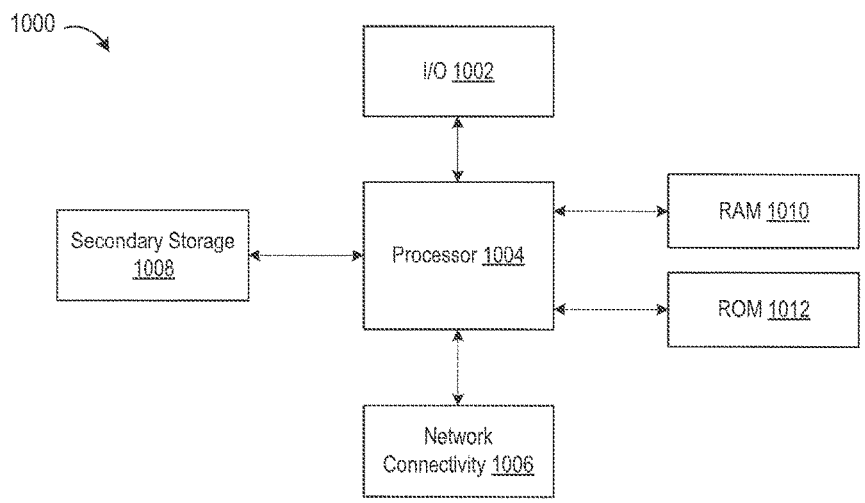
FIG. 8 illustrates an example computer system that may be suitable for implementing the in-device coexistence interference at a user device or network node.

The user device and network elements described herein may include any general or special purpose computer with sufficient processing power, memory resources, and network throughput capability to handle the necessary workload placed upon it. FIG. 8 illustrates an example computer system 1000 that may be suitable for implementing one or more embodiments disclosed herein. The computer system 1000 includes a processor 1004 (which may be referred to as a central processor unit or CPU) that is in communication with input/output (I/O) devices 1002, network connectivity devices 1006, an optional secondary storage 1008, random access memory (RAM) 1010, and read only memory (ROM) 1012. The processor may be implemented as one or more CPU chips.

The secondary storage 1008 is optionally included, and typically includes one or more disk drives or tape drives used for non-volatile storage of data and/or for over-flow data storage device if RAM 1010 is not large enough to hold all working data. Secondary storage 1008 may be used to store programs which are loaded into RAM 1010 when such programs are selected for execution. The ROM 1012 is used to store instructions and perhaps data which are read during program execution. ROM 1012 is a non-volatile memory device which typically has a small memory capacity relative to the larger memory capacity of secondary storage. The RAM 1010 is used to store volatile data and perhaps to store instructions. Access to both ROM 1012 and RAM 1010 is typically faster than to secondary storage 1008.

I/O devices 1002 may include on or more printers, video monitors, liquid crystal displays (LCDs), touch screen displays, keyboards, keypads, switches, dials, mice, track balls, voice recognizers, card readers, paper tape readers, or other well-known input devices.

The network connectivity devices 1006 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 1006 devices may enable the processor 1004 to communicate with an Internet or one or more intranets. With such a network connection, it is contemplated that the processor 1004 might receive information from the network, or might output information to the network in the course of performing the above-described method steps. Such information, which is often represented as a sequence of instructions to be executed using processor 1004, may be received from and outputted to the network, for example, in the form of a computer data signal embodied in a carrier wave or a non-transitory computer readable storage medium, such as RAM, ROM or other memory storage devices.

Such information, which may include data or instructions to be executed using processor 1004 for example, may be received from and outputted to the network, for example, in the form of a computer data baseband signal or signal embodied in a carrier wave. The baseband signal or signal embodied in the carrier wave generated by the network connectivity 1006 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1004 executes instructions, codes, computer programs, scripts which it accesses from hard disk, floppy disk, optical disk (these various disk-based systems may all be considered secondary storage 1008), ROM 1012, RAM 1010, or the network connectivity devices 1006. While only one processor 1004 is shown, multiple processors may be present. Thus, while instructions may be discussed as executed by a processor, the instructions may be executed simultaneously, serially, or otherwise executed by one or multiple processors. In addition or in the alternative, any required processing functionality may be executed by a cryptographic engine or other hardware accelerator circuit (not shown).

Figure 9:
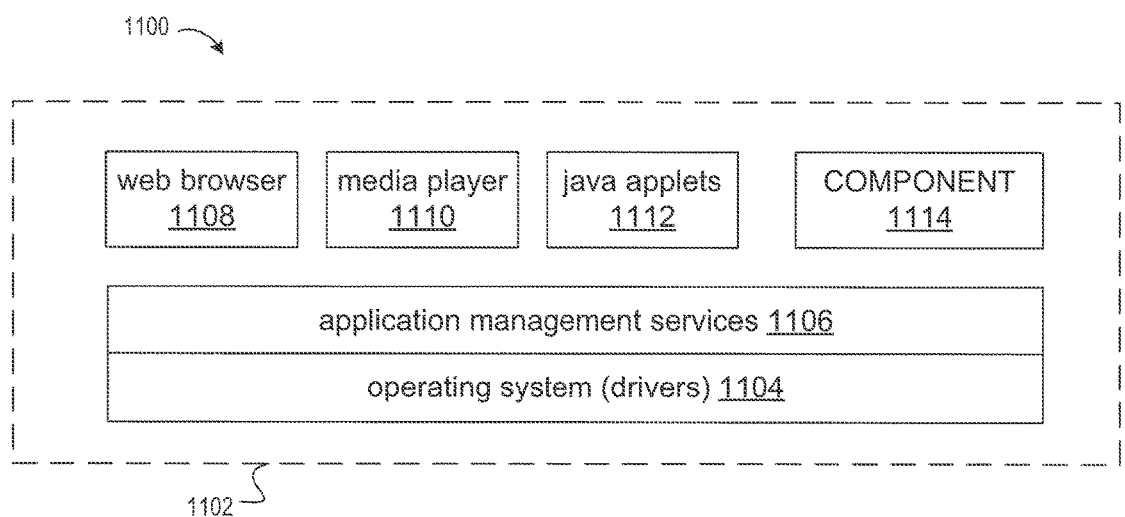
FIG. 9 is a diagram of a software environment that may be implemented on a user agent and/or network node operable for some of the various embodiments of the disclosure.

FIG. 9 is a diagram of a software environment 1100 that may be implemented on a communication device and/or network node operable for some of the various embodiments of the disclosure. As illustrated, one or more processing resources at the communication device or network node execute operating system drivers 1104 that provide a platform from which the rest of the software operates. The operating system drivers 1104 provide drivers for the device hardware with standardized interfaces that are accessible to application software. The operating system drivers 1104 include application management services ("AMS") 1106 that transfer control between applications running on the device. In UE instances, the software environment 1102 includes a web browser application 1108, a media player application 1110, and Java applets 1112 are provided as device applications. The web browser application 1108 configures the UE device to operate as a web browser, allowing a user to enter information into forms and select links to retrieve and view web pages. The media player application 1110 configures the UE to retrieve and play audio or audiovisual media. The Java applets 1112 configure the UE device to provide games, utilities, and other functionality. Finally, the component 114 may provide the in-device coexistence interference management functionality described herein.

Figure 10:
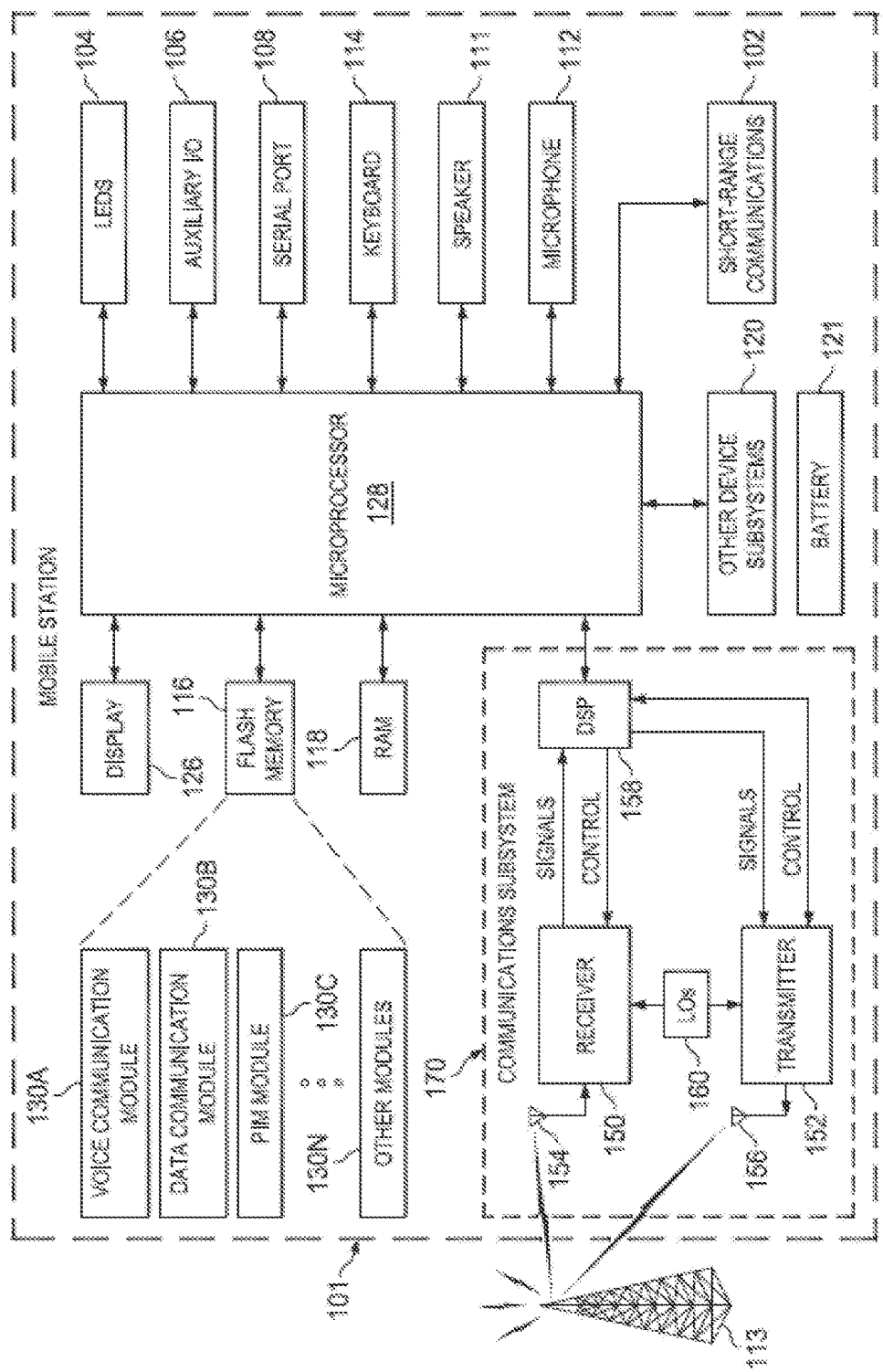
FIG. 10 is a schematic block diagram illustrating exemplary components of a mobile wireless communications device which may be used with selected embodiments of the present invention.

Referring now to FIG. 10, there is shown a schematic block diagram illustrating exemplary components of a mobile wireless communications device 101 which may be used with selected embodiments of the present invention. The wireless device 101 is shown with specific components for implementing features described above. It is to be understood that the wireless device 101 is shown with very specific details for exemplary purposes only.

A processing device (e.g., microprocessor 128) is shown schematically as coupled between a keyboard 114 and a display 126. The microprocessor 128 controls operation of the display 126, as well as overall operation of the wireless device 101, in response to actuation of keys on the keyboard 114 by a user.

The wireless device 101 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 101 are shown schematically. These include a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 101 may have a battery 121 to power the active elements of the wireless device 101. The wireless device 101 is in some embodiments a two-way radio frequency (RF) communication device having voice and data communication capabilities. In addition, the wireless device 101 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 101 may also be stored to the RAM 118.

The microprocessor 128, in addition to its operating system functions, enables execution of software applications on the wireless device 101. A predetermined set of software applications that control basic device operations, such as a voice communications module 130A and a data communications module 130B, may be installed on the wireless device 101 during manufacture. In addition, a personal information manager (PIM) application module 130C may also be installed on the wireless device 101 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 includes a processing module, such as a digital signal processor (DSP) 158, and local oscillators (LOs) 160. In some embodiments, the communication subsystem 170 includes a separate antenna arrangement (similar to the antennas 154 and 156) and RF processing chip/block (similar to the Receiver 150, LOs 160 and Transmitter 152) for each RAT, although a common baseband signal processor (similar to DSP 158) may be used for baseband processing for multiple RATs. The specific design and implementation of the communication subsystem 170 is dependent upon the communication network in which the wireless device 101 is intended to operate. For example, the communication subsystem 170 of the wireless device 101 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1×EV-DO. The communication subsystem 170 may also be designed to operate with an 802.11 Wi-Fi network, and/or an 802.16 WiMAX network. Other types of data and voice networks, both separate and integrated, may also be utilized with the wireless device 101.

Network access may vary depending upon the type of communication system. For example, in the Mobitex™ and DataTAC™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 101 may send and receive communication signals over the communication network 113. Signals received from the communication network 113 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 113 are processed (e.g., modulated and encoded) by the DSP 158 and are then provided to the transmitter 152 for digital to analog conversion, frequency up conversion, filtering, amplification and transmission to the communication network 113 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 113 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 101. In addition, the display 126 may also be utilized in voice communication mode, for example, to display the identity of a calling party, the duration of a voice call, or other voice call related information.

The short-range communications subsystem 102 enables communication between the wireless device 101 and other proximate systems or devices, which need not necessarily be similar devices. For example, the short range communications subsystem may include an infrared device and associated circuits and components, or a Bluetooth™ communication module to provide for communication with similarly-enabled systems and devices.

By now it should be appreciated that there is disclosed herein a method for use in a radio access network (eNB) by user equipment (UE) having a first radio technology component (e.g., an LTE component) and a second radio technology component (e.g., a GPS or ISM) on a single platform. In the disclosed system and methodology, a preferred frequency notification scheme is provided for specifying a preferred frequency band for an LTE component that is separated from the non-LTE components (ISM or GNSS) using RRC signaling during the call setup procedures. In still further embodiments, computer program product is disclosed that includes a non-transitory computer readable storage medium having computer readable program code embodied therein with instructions which are adapted to be executed to implement a method for operating user equipment (UE) and/or a radio access network (eNB) in a coexistence mode, substantially as described hereinabove.

There is also disclosed herein a method for use in a user equipment (UE) device having first and second radio technology components on a single platform, where the first radio technology component may be an LTE component and the second radio technology component may be a GNSS or ISM-based component. In the disclosed methodology, the first radio technology component detects in-device coexistence (IDC) interference from the second radio technology component, such as by measuring IDC interference from the second radio technology component or receiving an internal message indicating that the second radio technology component is or will be enabled. In addition or in the alternative, the internal message identifies a transmission frequency band being used by the second radio technology component. On or before detecting coexistence interference, the UE sends a coexistence interference indication message with one or more proposed control parameters for establishing a coexistence mode for the first and second radio technology components by specifying a preferred frequency notification for the first radio technology component. In selected embodiments, the coexistence interference indication message is sent as an RRC message to specify the preferred frequency notification for the first radio component, where the RRC message may be a UECapabilityInformation message, a UEInformationResponse message, an RRCConnectionRequest message, an RRCConnectionReconfigurationComplete message, an RRCConnectionReestablishmentRequest message, a MeasurementReport message or a new RRC message to specify the preferred frequency notification for the first radio component. In this message, the preferred frequency notification may convey a fixed or variable frequency boundary which defines usable frequencies for the first radio technology component which will not interfere with the second radio technology component. In addition or in the alternative, the preferred frequency notification conveys a frequency boundary which defines unusable frequencies for the first radio technology component which will interfere with the second radio technology component. In addition or in the alternative, the preferred frequency notification may convey a transmission scheme used by the second radio technology component to implicitly specify a frequency band used by the second radio technology component. For example, the transmission scheme may be conveyed with a multi-bit field element which separately identifies which transmission scheme from a plurality of transmission schemes is being used by the second radio technology component, or with a one bit field element to separately identify an Industrial, Science and Medical (ISM) transmission scheme and a Global Navigation Satellite System (GNSS) transmission scheme used by the second radio technology component. Alternatively, the preferred frequency notification may be specified for the first radio component by identifying a transmission scheme used by the second radio technology component to implicitly specify a frequency band used by the second radio technology component using a system parameter which defines an interferable frequency band associated with each transmission scheme. Subsequently, the UE device receives a response message with one or more control parameters for establishing a new frequency for the first radio technology component, and then enables the first radio technology component with the one or more control parameters to use the new frequency without interference to/from the second radio technology component. As will be appreciated, the new frequency should be consistent with the preferred frequency notification specified in the coexistence interference indication message, though this may not always be the case due to scheduling considerations at the network.

In addition, there is disclosed a method use in a radio access network node (eNB) to avoid interference between first and second radio technology components located on a single platform at a UE. In the disclosed methodology, the network node receives a coexistence interference indication message having one or more proposed control parameters for establishing a coexistence mode for the first and second radio technology components by specifying a preferred frequency notification for the first radio technology component. In selected embodiments, the coexistence interference indication message is received as an RRC message to specify the preferred frequency notification for the first radio component where the preferred frequency notification is a frequency boundary which defines usable (or unusable) frequencies for the first radio technology component to avoid interference with the second radio technology component. In addition or in the alternative, the received preferred frequency notification identifies a transmission scheme used by the second radio technology component to implicitly specify a frequency band used by the second radio technology component, such as by applying a predefined system parameter to identify an interferable frequency band associated with the identified transmission scheme used by the second radio technology component, and then selecting the new frequency for the first radio technology component to be outside of the interferable frequency band. At the network node, the preferred frequency notification is processed to select the new frequency for the first radio technology component which will not interfere with the second radio technology component, and the network node then sends a response message to the UE with one or more control parameters for establishing a new frequency for the first radio technology component so that the first radio technology component at the UE can be enabled to use the new frequency without interference to/from the second radio technology component.

In another form there is disclosed a computer program product implemented as a non-transitory computer readable storage medium having computer readable program code embodied therein that is adapted to be executed to implement a method for operating user equipment (UE) in a coexistence mode. As disclosed, the computer program product includes instructions for detecting at the first radio technology component in-device coexistence interference from the second radio technology component. In addition, the computer program product includes instructions for sending a coexistence interference indication message comprising one or more proposed control parameters for establishing a coexistence mode for the first and second radio technology components by specifying a preferred frequency notification for the first radio technology component. The computer program product also includes instructions for receiving a response message comprising one or more control parameters for establishing a new frequency for the first radio technology component. Finally, the computer program product includes instructions for enabling the first radio technology component with the one or more control parameters to use the new frequency without interference to/from the second radio technology component In yet another form, there is disclosed a user equipment device and method for operating same. As disclosed, the UE device includes first and second radio technology components on a shared platform, along with processor control logic and/or circuitry configured to provide a preferred frequency notification for the first radio technology component to avoid in-device coexistence (IDC) interference from the second radio technology component. In particular, the processor control logic and/or circuitry is configured to detect IDC interference at the first radio technology component caused by the second radio technology component. To this end, the processor control logic and/or circuitry may be configured to detect IDC interference by receiving an internal message that the second radio technology component is or will be enabled, or by measuring at the first radio technology component in-device coexistence interference from the second radio technology component. The processor control logic and/or circuitry is also configured to send a coexistence interference indication message with one or more proposed control parameters for establishing a coexistence mode for the first and second radio technology components by specifying a preferred frequency notification for the first radio technology component. In selected embodiments, the processor control logic and/or circuitry sends the coexistence interference indication message by sending an RRC message to specify the preferred frequency notification for the first radio component, where the preferred frequency notification comprises a frequency boundary which defines usable (or unusable) frequencies for the first radio technology component to avoid interference with the second radio technology component. In addition or in the alternative, the preferred frequency notification identifies a transmission scheme used by the second radio technology component to implicitly specify a frequency band used by the second radio technology component. Finally, the processor control logic and/or circuitry is configured to receive and process a response message having one or more control parameters for establishing a new frequency for the first radio technology component.

It should be understood that as used herein, terms such as coupled, connected, electrically connected, in signal communication, and the like may include direct connections between components, indirect connections between components, or both, as would be apparent in the overall context of a particular embodiment. The term coupled is intended to include, but not be limited to, a direct electrical connection.

Numerous modifications and variations of the present application are possible in light of the above teachings. It is therefore to be understood that within the scope of the appended claims, the embodiments of the application may be practiced otherwise than as specifically described herein.

Although the described exemplary embodiments disclosed herein are described with reference to a coexistence operation mode whereby different signaling components are separated in time to avoid coexistence interference, the present invention is not necessarily limited to the example embodiments which illustrate inventive aspects of the present invention that are applicable to a wide variety of signaling schemes and applications. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A method for use in user equipment (UE) device comprising first and second radio components, comprising:
   sending a Radio Resource Control (RRC) message, the RRC message comprising one or more control parameters by specifying a preferred frequency notification for the first radio component, wherein the preferred frequency notification indicates a fixed frequency boundary, a variable frequency boundary, or a transmission scheme which defines usable frequencies for the first radio component that will reduce interference or not interfere with the second radio component; and receiving, in response to the RRC message, a response message comprising one or more control parameters used by the first radio component for establishing communications.

2. The method of claim 1, wherein the RRC message is a coexistence interference indication message.

3. The method of claim 1, where the first radio component comprises an LTE component, and where the second radio component comprises a Global Navigation Satellite System (GNSS) component or a component operating in an Industrial, Science and Medical (ISM) frequency band.

4. The method of claim 1, further comprising receiving at the first radio component an internal message that the second radio component is or will be enabled.

5. The method of claim 1, further comprising receiving at the first radio component an internal message identifying a transmission frequency band being used by the second radio component.

6. The method of claim 1, further comprising measuring, by the UE, at the first radio component in-device coexistence interference from the second radio component.

7. The method of claim 1, wherein the preferred frequency notification comprises a fixed frequency boundary which defines usable frequencies for the first radio component that will not interfere with the second radio component.

8. The method of claim 1, wherein the preferred frequency notification comprises a variable frequency boundary which defines usable frequencies for the first radio component that will not interfere with the second radio component.

9. The method of claim 1, wherein the preferred frequency notification comprises a frequency boundary which defines unusable frequencies for the first radio component that will interfere with the second radio component.

10. The method of claim 1, wherein the preferred frequency notification identifies a transmission scheme used by the second radio component to implicitly specify a frequency band used by the second radio component.

11. A method for use in a radio access network (eNB) to avoid interference between a first radio component in a user equipment (UE) and a second radio component in the UE, comprising:

receiving a Radio Resource Control (RRC) message, the RRC message comprising one or more control parameters for establishing a coexistence mode for the first radio and second radio components by specifying a preferred frequency notification for the first radio component, wherein the preferred frequency notification identifies a fixed frequency boundary, a variable frequency boundary, or a transmission scheme that which defines usable frequencies for the first radio component that will reduce interference or not interfere with the second radio component; and sending, by the eNB and in response to the RRC message, a response message comprising one or more control parameters used by the first radio component for establishing communications.

12. The method of claim 11, wherein the RRC message is a coexistence interference indication message.

13. The method of claim 11, wherein the preferred frequency notification comprises a frequency boundary that defines usable frequencies for the first radio component that will not interfere with the second radio component.

14. The method of claim 11, where the RRC message comprises a UECapabilityInformation message, a UEInformationResponse message, an RRCConnectionRequest message, an RRCConnectionReconfigurationComplete message, an RRCConnectionReestablishmentRequest message, a MeasurementReport message, or a new RRC message that specifies the preferred frequency notification for the first radio component.

15. The method of claim 11, wherein the preferred frequency notification comprises a frequency boundary which defines unusable frequencies for the first radio component that will interfere with the second radio component.

16. The method of claim 11, wherein the preferred frequency notification identifies a transmission scheme used by the second radio component to implicitly specify a frequency band used by the second radio component.

17. The method of claim 16, further comprising:

applying a predefined system parameter to identify an interferable frequency band associated with the identified transmission scheme used by the second radio component; and selecting a new frequency for the first radio component to be outside of the interferable frequency band.

18. A user equipment (UE) device, comprising:

a first radio component;

a second radio component;

at least one hardware processor; and a non-transitory computer-readable storage medium coupled to the at least one hardware processor and storing programming instructions for execution by the at least one hardware processor, wherein the programming instructions, when executed, cause the at least one hardware processor to perform operations comprising:

sending a Radio Resource Control (RRC) message, the RRC message comprising one or more control parameters by specifying a preferred frequency notification for the first radio component, wherein the preferred frequency notification indicates a fixed frequency boundary, a variable frequency boundary, or a transmission scheme which defines usable frequencies for the first radio component that will reduce interference or not interfere with the second radio component; and receiving, in response to the RRC message, a response message comprising one or more control parameters used by the first radio component for establishing communications.

19. The UE of claim 18, wherein the RRC message is a coexistence interference indication message.

\* \* \* \* \*